Figure 1A:
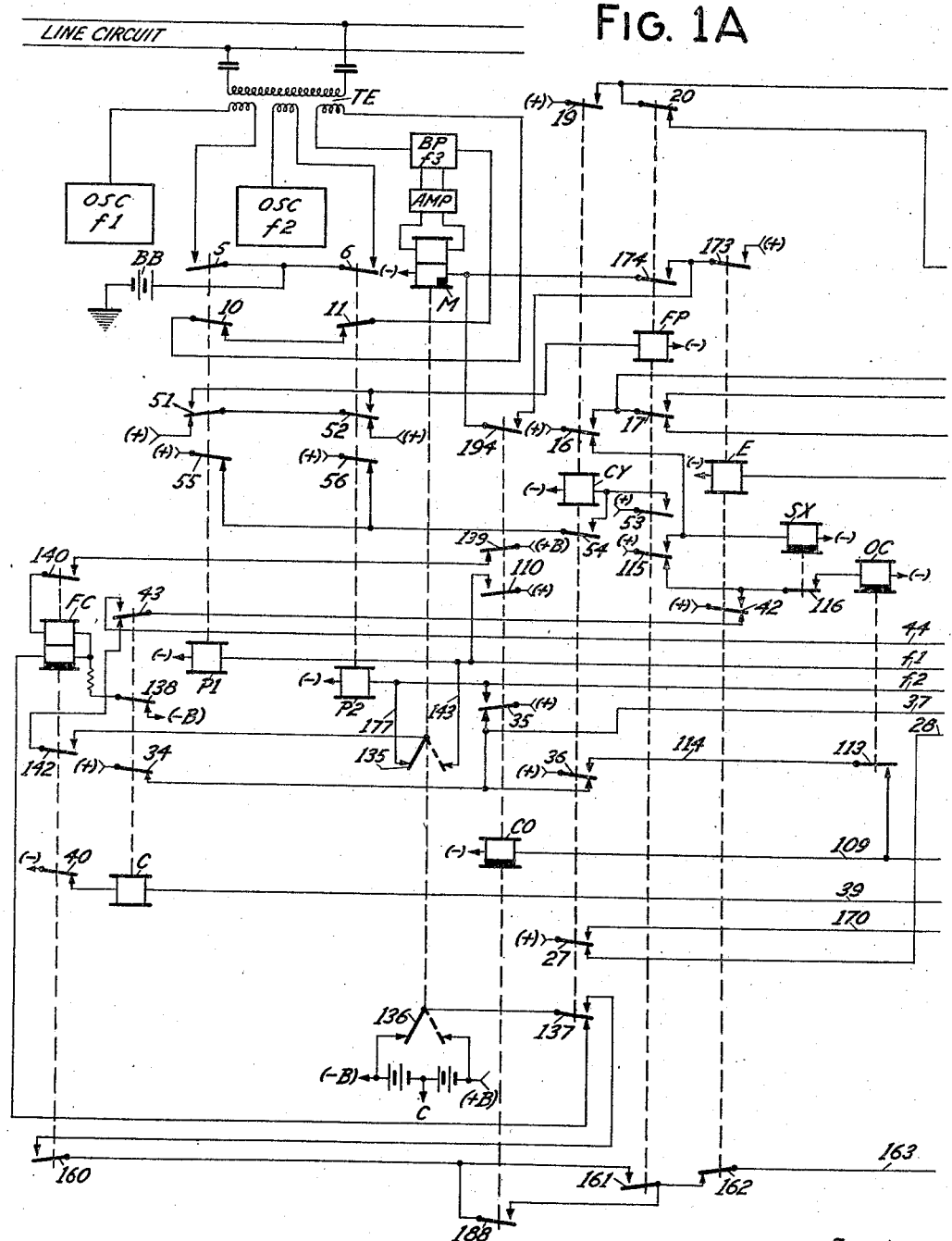

Dec. 14, 1948.　　　　N. D. PRESTON ET AL　　　　2,456,533
CENTRALIZED TRAFFIC CONTROL SYSTEM FOR RAILROADS
Filed May 14, 1945　　　　　　　　　　　　　　　8 Sheets-Sheet 1

Inventors
N. D. Preston and F. B. Hitchcock
By Neil D. Preston,
their Attorney

Dec. 14, 1948. N. D. PRESTON ET AL 2,456,533
CENTRALIZED TRAFFIC CONTROL SYSTEM FOR RAILROADS
Filed May 14, 1945 8 Sheets-Sheet 2

Inventors
N.D. Preston and F.B. Hitchcock
By
Neil W. Preston
their Attorney

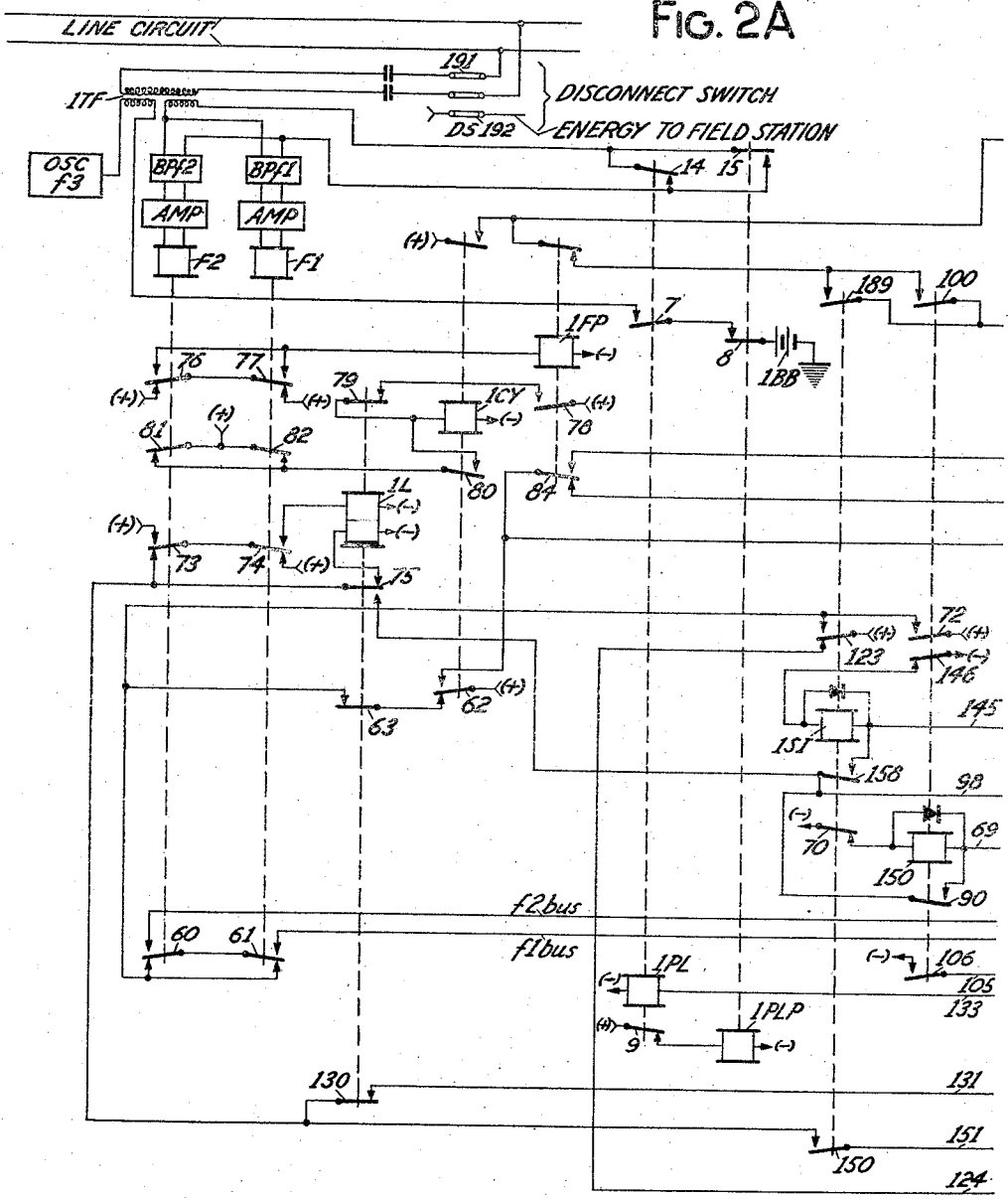

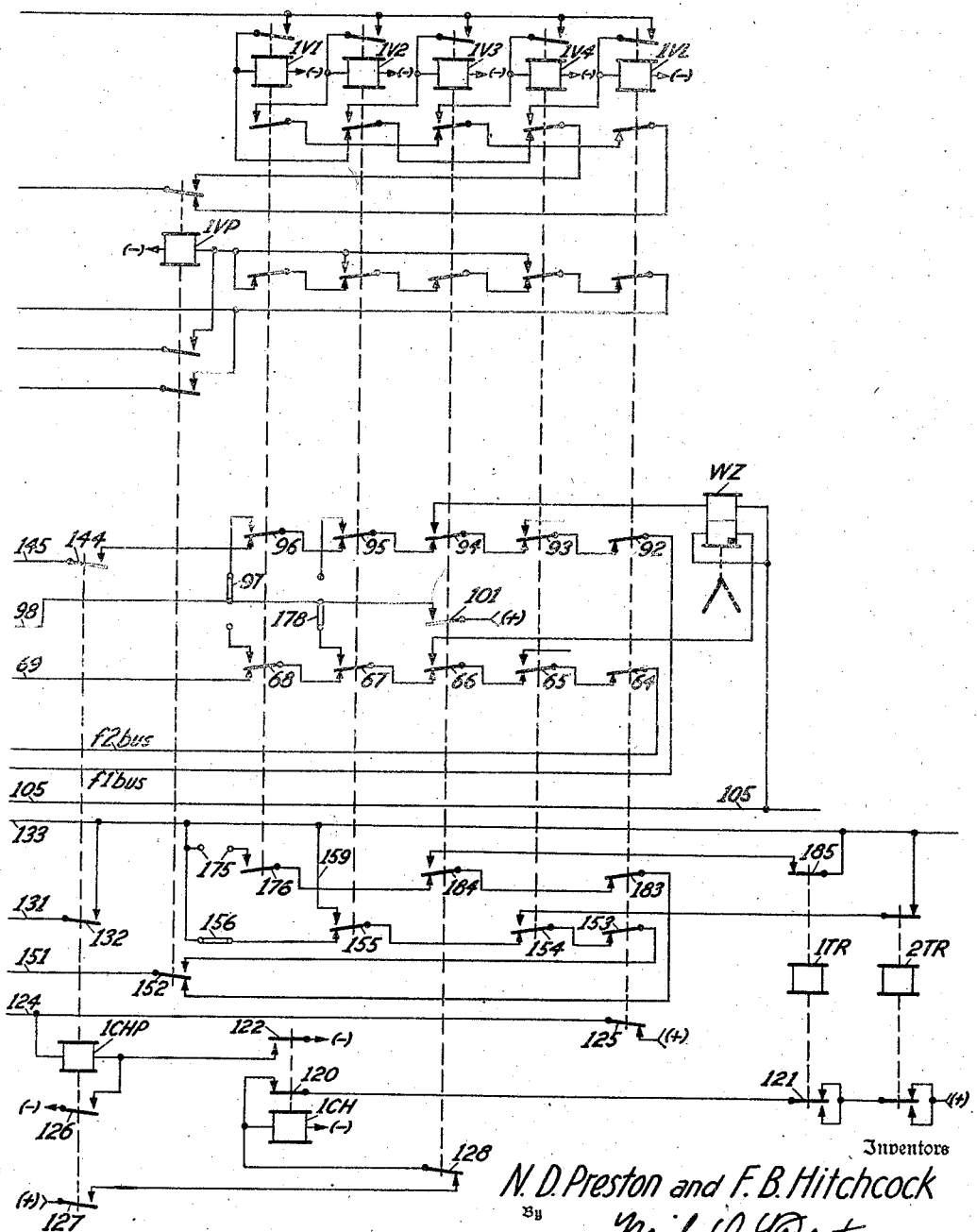

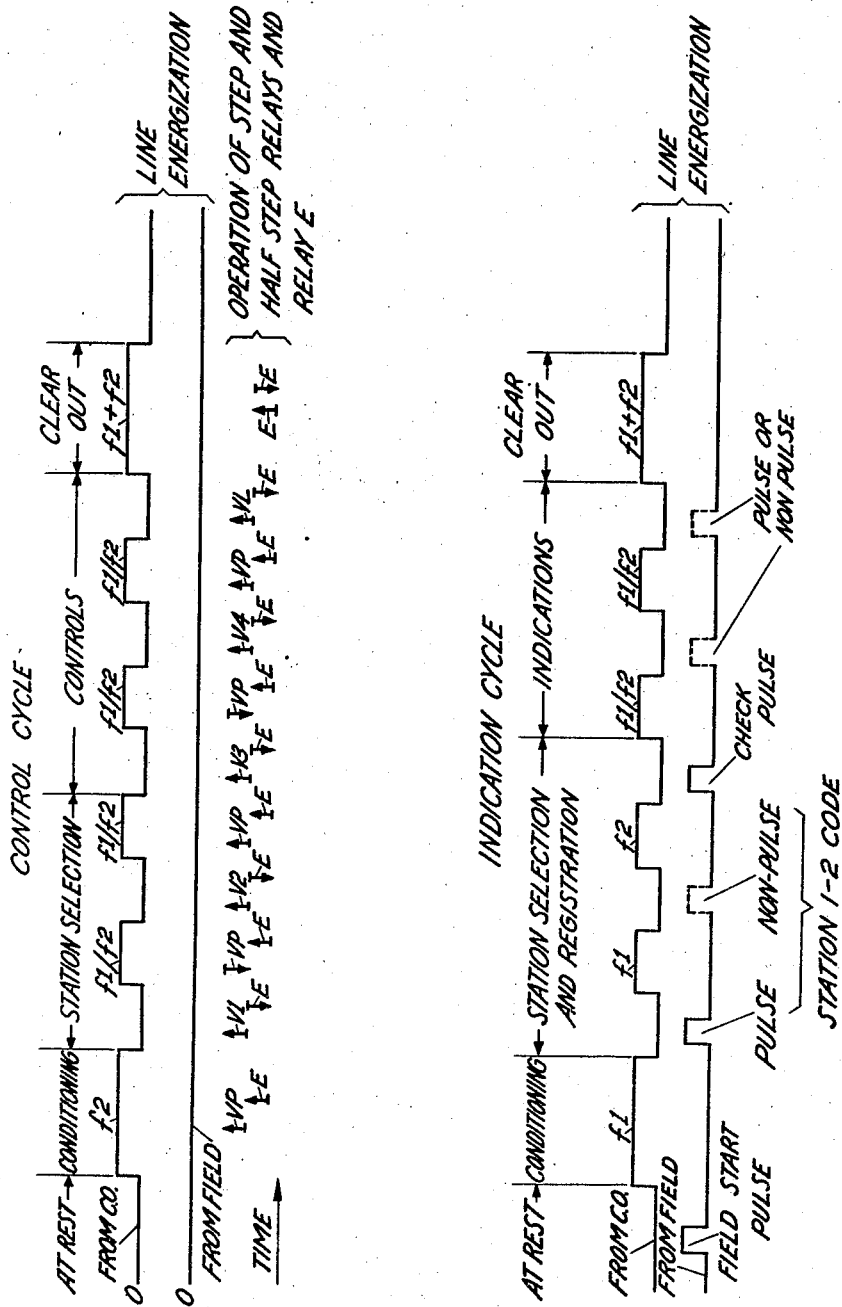

Dec. 14, 1948. N. D. PRESTON ET AL 2,456,533
CENTRALIZED TRAFFIC CONTROL SYSTEM FOR RAILROADS
Filed May 14, 1945 8 Sheets-Sheet 6

CARRIER CURRENT CTC SYSTEM SEQUENCE DIAGRAMS

TYPICAL STATION SELECTING STEP FOR CONTROLS

TYPICAL CONTROL

CLEAR OUT PERIOD FOR CONTROLS

Inventors
N.D. Preston and F.B. Hitchcock
By Neil D. Preston,
their Attorney

Dec. 14, 1948.  N. D. PRESTON ET AL  2,456,533
CENTRALIZED TRAFFIC CONTROL SYSTEM FOR RAILROADS
Filed May 14, 1945  8 Sheets-Sheet 7

Inventors
N.D. Preston and F.B. Hitchcock
By Neil D. Preston,
their Attorney

Dec. 14, 1948.  N. D. PRESTON ET AL  2,456,533
CENTRALIZED TRAFFIC CONTROL SYSTEM FOR RAILROADS
Filed May 14, 1945  8 Sheets-Sheet 8
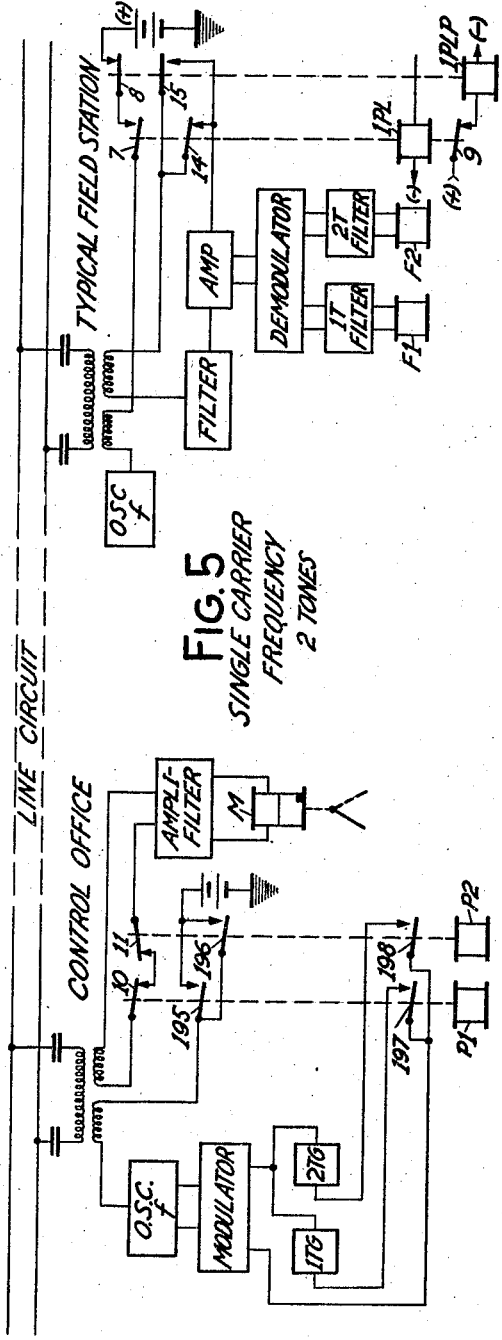
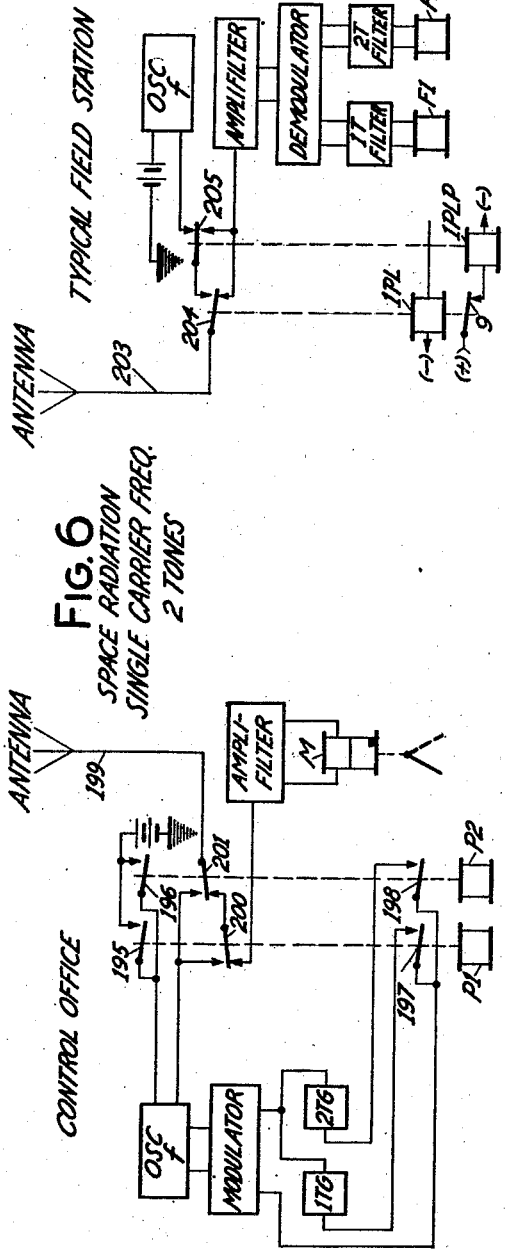
Inventors
N. D. Preston and F. B. Hitchcock
Neil D. Preston,
their Attorney Patented Dec. 14, 1948

2,456,533

UNITED STATES PATENT OFFICE 2,456,533

CENTRALIZED TRAFFIC CONTROL SYSTEM FOR RAILROADS

Neil D. Preston and Forest B. Hitchcock, Rochester, N. Y., assignors to General Railway Signal Company, Rochester, N. Y.

Application May 14, 1945, Serial No. 593,576

35 Claims. (Cl. 177—353)

This invention relates to code communication systems of the carrier frequency type, and more particularly to such a communication system for centralized traffic control systems on railroads.

Generally speaking, a communication system is employed in centralized traffic control systems on railroads for transmitting suitable controls from a control office to field stations along the railroad to govern the operation of switches and signals controlling train movement, and also for transmitting indications to the control office from the various field stations so as to indicate for the information of the operator the position or condition of the various switches and signals under his control, and also the movement of trains into and out of approach and detector track sections. Systems of this character are in use, and their functions, characteristic features and mode of operation are generally familiar to those skilled in the art.

Code communication systems of this type which employ direct current impulses of different polarity, duration or spacing applied to line circuits, have been developed and are in practical use, but in various applications of centralized traffic control systems to railway operation, and also for other communication purposes, it is desirable to have a communication system operating by transmission of carrier frequency impulses for use in connection with a radio or space radiation type of system, or in connection with line circuits utilized for other facilities, such as power transmission, telephone, telegraph or the like, where it is desirable to avoid changing the continuity of the line circuit by opening it for communication purposes, or changing its electrical characteristics by a shunt, or applying direct current impulses to interfere with such other facilities.

The primary object of this invention is to provide such a communication system which will operate over a line circuit, or by space radiation, by transmission of carrier frequency pulses, with or without modulation by control tones, in such a manner as to afford all of the necessary operating characteristics and features required of such a communication system suitable for centralized traffic control systems for railroads, including provisions for exercising a predetermined priority or preference as between any plurality of field stations having new indications to transmit to the control office at the same time.

A further object of the invention is to attain these functions and operating characteristics in a simple and effective way with conventional relays and other well known apparatus, and to provide for rapid and reliable code transmission, more particularly by using short periods for conditioning and clear-out at the beginning and end respectively of each operating cycle, so as to obtain a shorter total time for an operating cycle of a given number of steps, as compared with the usual practice of employing slow-release relays to obtain conditioning and clear-out periods distinctive from other intervals in transmission and reception of code elements during the operating cycle, due to the prolonged duration of such conditioning and clear-out periods.

The organization of parts and circuits constituting the system of this invention involves a variety of interrelated functions and operations too involved to summarize briefly and clearly; but certain features and functions characterizing the invention may be pointed out to advantage before describing the system in detail.

Generally speaking, and without attempting to define the nature or scope of this invention, it is proposed to utilize carrier frequency pulses of distinctive character for the code elements transmitted at successive intervals during an operating cycle, so as to make up the desired code calls identifying the different field stations for station selection purposes, and for communication of the desired controls and indications to and from the field stations as selected one at a time during different control and indication cycles. In one organization of the system of this invention, two different carrier frequencies, conveniently termed $f1$ and $f2$, are employed to give distinctive character to the code elements transmitted from the control office to the field stations; and the code elements transmitted from the field stations to the control office are distinctive in character by reason of the transmission or non-transmission of another carrier frequency $f3$ at predetermined "off" intervals in the operating cycle existing between the transmission of impulses of the carrier frequency $f1$ or $f2$ from the control office. In a modified organization of the system, suitable for communication by radio or space radiation, as well as over a line circuit, the control office modulates one carrier frequency with different control tones to give distinctive character to its code elements, while the field stations transmit, or fail to transmit, at predetermined "off" intervals in the operating cycle, pulses of the same carrier frequency without any modulation.

Still speaking generally with regard to the features of the system of this invention, another characteristic is that the necessary preference or priority, as between any plurality of field stations ready to send indications to the control office during an indication cycle, is exercised on the basis of the relative superiority of the code call allotted to the various field stations, in accordance with the general principles disclosed in our prior Patent No. 2,129,183, September 6, 1938. In the case of the present carrier frequency system, however, the field station or stations with a superior code call does not exercise its code superiority directly against other stations by controlling a line circuit, as in our prior patent, but such code superiority is exercised indirectly through the agency of code elements retransmitted from the control office in response to code elements received from the field stations, with the appropriate priority determined by the control office apparatus. Stated more specifically, each field station, having new indications to transmit to the control office during an indication cycle, has an opportunity during the first "off" interval to send to the control office a code element having its character dependent upon the first code element of the code call allotted to that station; and during the next succeeding "on" interval, the control office transmits to all of the field stations a code element dependent upon that received from these field stations, acting automatically to send one predetermined superior code element in preference to another inferior code element, if this is called for by any one of these field stations. Such repeating transmission of a superior code element from the control office, when called for, will automatically cause each of the field stations, if any, having a corresponding code element of the inferior character in its station code call, to drop out for that operating cycle, leaving only those field stations having a superior code element in their station code calls effective to transmit to the control office during the next "off" interval.

The same operation of transmitting station identifying code elements from any remaining station to the control office during "off" intervals, the repeat or retransmission of code elements of a like character from the control office to such a remaining station or stations during the next succeeding "on" intervals with the necessary priority, and the dropping out of a station as soon as its code does not reach the code elements transmitted from the control office, may be repeated for as many step intervals as desired, until only one station having the most superior code call of the plurality initially acting remains effective, whereupon this particular indication cycle is carried on with transmission of indications from this surviving field station. Other features of this organization for providing the necessary priority between the field stations trying to send in indications to the control office at the same time will be explained later in discussing the apparatus and circuits and their operation in detail.

A still further characteristic of the system of this invention relates to the restoration of the apparatus in the control office and at the various field stations to the normal at-rest condition at the end of each operating cycle. In accordance with this invention, this restoration or clear-out is accomplished quickly by a distinctive transmission condition of both frequencies or control tones from the control office simultaneously. In addition to providing such clear-out control at the end of each operating cycle, provision is made to give this clear-out control automatically whenever a prolonged energization or deenergization of the line circuit occurs during an operating cycle, so as to obtain results comparable with those where the clear-out is obtained by the release of slow-acting relays in response to a prolonged deenergization of the line circuit. In this connection, special means is also provided to avoid improper operation of a field station equipment when it is re-connected to the line circuit, after having been disconnected for some reason, as explained more in detail later.

Various other characteristic features, funcctions, attributes, and advantages of the system of this invention will be in part apparent, and also explained as the specified embodiments of the invention illustrated are described.

In describing in detail, the particular embodiments of the invention herein disclosed, reference will be made to the accompanying drawings which illustrate, in a conventional and diagrammatic manner, the various parts and circuits of the apparatus for the control office and one typical field station, these parts and circuits being shown more with the view of simplifying the illustration and facilitating an understanding of the organization and its operation, then for the purpose of showing in detail the structures and circuit connections preferably employed in practice.

Various conventional illustrations and symbols have been employed in these drawings to simplify the representation and understanding of the relays and circuits. The contact fingers of the various relays, which are identified with their respective coils or windings by dash lines, are shown in a horizontal or raised position when the relay is energized, and in an inclined or lowered position when the relay is deenergized, regardless of the location of the contact fingers with relation to its operating winding. Instead of showing all of the wiring connections to the terminals of a battery, or other suitable source of current, the ends of wires connected to the opposite terminals of such a current source are designated by arrows, pointing toward or away from the wire and indicating the flow of current into and out of the circuit, with the symbols (+) and (—). Certain circuits are arranged to be energized from a split battery, and connections to the extreme terminals are designated for convenience (+) B (—) B, and the connections to the mid-tap by the letter C.

Various relays, such as the relays of the stepping bank, are employed in the control office and at each of the field stations to perform the same function; and for convenience these relays are identified with the same letter, with a prefix I for those associated with the typical field station equipment shown. Various other schematic and diagrammatic representations used in the drawings will be explained as the description progresses.

Figure 1B:
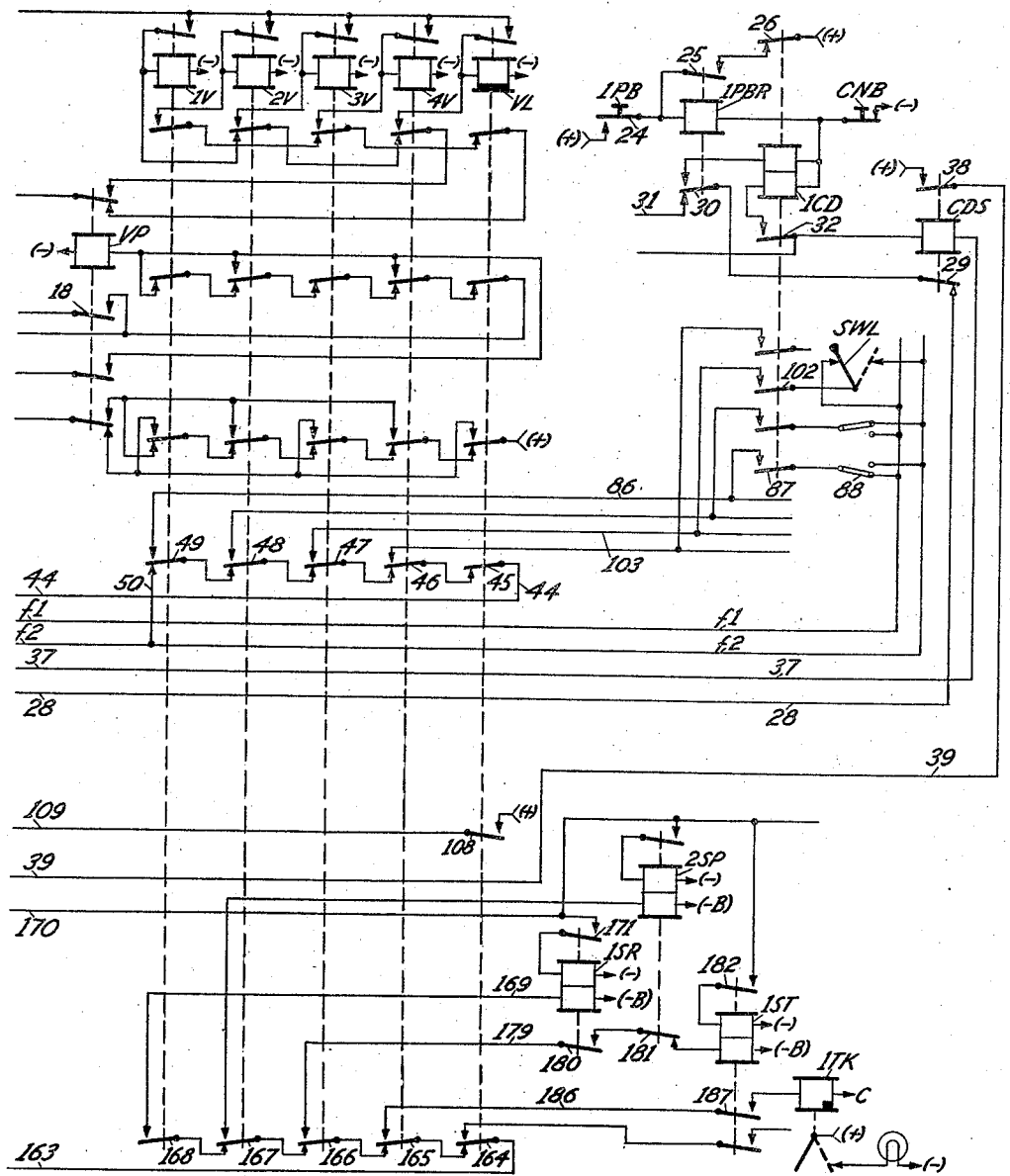

In the accompanying drawings, Figs. 1A and 1B, when arranged side by side, illustrate the relays and circuits for the control office; Figs. 2A and 2B side by side illustrate the relays and circuits for a typical field station; Fig. 3 comprises explanatory diagrams or graphs to illustrate the periods or intervals of energization of the line circuit, or transmission of carrier frequency by space radiation, during typical control and indication cycles; Figs. 4A to 4H show time or sequence charts or diagrams for certain relay operations in the control office and the typical field stations involved in various periods or stages of typical control and indication cycles, for the purpose of facilitating an explanation and understanding of the operation of the system; and Figs. 5 and 6 show certain parts of the system involved in modifications using one carrier frequency and two control tones.

GENERAL ORGANIZATION

The purpose and general mode of operation of code communication systems for centralized traffic control systems are explained in various prior art patents, such as our Patent No. 2,129,183, September 6, 1938; Hailes, et al. No. 2,259,561, October 21, 1941, and Judge, et al. No. 2,082,544, January 1, 1937. In brief, the primary purpose of a code communication system of this character is to provide for the transmission of controls and indications between a control office and a plurality of field stations located at various points along the railroad adjacent switches and signals. The particular way in which the controls govern the operation of switches and signals forms no part of the present invention, and one typical form of such control circuits is illustrated and described in detail in the patent to Wells, No. 2,159,922, May 23, 1939. The indications received in the control office are usually employed to control the lighting of small indicating lamps associated with a track diagram, control levers and the like, as explained in our prior Patent No. 2,129,183 and the others above mentioned.

A typical centralized traffic control system ordinarily involves a number of different field stations at spaced points along the railroad; but since the apparatus and circuits for these various field stations is generally identical, except for certain connections or code jumpers for setting up distinctive code calls for the respective stations, and perhaps in the number of devices to be controlled or indicated, it will be sufficient to show and explain these apparatus and circuits for one typical field station, such as shown in Figs. 2A and 2B, with such reference to operations occurring at like field stations as may be necessary.

The control office in this system may be located at any point with relation to the location of the field stations, so long as it is within effective range. The equipment located in the control office comprises certain apparatus and connecting circuits, such as control levers, indication devices, and the like, which relate to individual field stations and are merely duplicate devices having the same function; and for the purposes of understanding the present invention, it is sufficient to illustrate and describe the operation of certain of these devices as typical of all the others, with the understanding that there are in fact a number of such control levers, indication devices and the like in the complete system.

In the main form of the invention illustrated in Figs. 1A, 1B, 2A and 2B, it is contemplated that the communication system of the invention will operate over a conventional two-wire line circuit, to which there are applied various other communication facilities, such as a telephone or telegraph system of various types, including carrier current frequency systems, or a telephone despatching system with selective ringing, alternating current power transmission, or other facilities requiring that the continuity and electrical characteristics of this line circuit should not be interfered with by the operation of the communication system. Such additional facilities on the same pair of line wires with the communication system of this invention may take various forms and have not been shown.

The line circuit used with this invention is, of course, provided with appropriate terminating impedances (not shown) at its end or ends beyond the field station remote from the control office, with due regard to the location of the control office and the characteristic impedance of the line circuit, in accordance with well known principles and practice for carrier current transmission on line circuits. Such line circuit termination is not only desirable for effective energy transfer to the line circuit, but may be necessary in a system of this type to avoid wave reflection from the end or ends of the line circuit and formation of so-called standing waves to create a nodal point of zero or low energy level where a field station is to be located, with the result that such field station would not respond to the carrier frequency applied in the control office. When the line circuit is properly terminated, however, each of the field stations connected to it will receive adequate energy from the carrier frequency transmitted from the control office regardless of their particular location.

Since such additional facilities on the same line circuit may impose limitations as to the carrier frequency available for this communication system, aside from the attenuation characteristics of the line circuit, so that the carrier frequency chosen for a communication system of this invention is of an order not well adapted for tone modulation and efficient filtering, it is proposed to employ two different frequencies $f1$ and $f2$ for giving distinctive character to the code elements transmitted from the control office, and another different frequency $f3$ for pulse transmission from the field stations, together with such connections between the generating and receiving means for such frequencies and the line circuit as will not interfere with the additional facilities on the same line circuit. While various frequencies may be employed for this purpose, it is preferable to use a frequency $f3$ for the field station pulses which is substantially different from both of the frequencies $f1$ and $f2$ transmitted from the control office, in order that the necessary discrimination later discussed may be obtained by relatively simple and low loss filters. The frequencies $f1$ and $f2$ for control office transmission may be more nearly alike, since the filters to discriminate them are operated at the same energy level. The choice of these frequencies largely depends upon the other facilities on the line circuit; but frequencies of 3,000 and 3,200 cycles per second for $f1$ and $f2$, and a frequency of 4,000 for the frequency $f3$, are typical examples of suitable frequencies for use with the facilities ordinarily used on line circuits along railroads, including carrier current telephone or telegraph.

For the purpose of generating these carrier frequencies in a control office and at the various field stations, any suitable frequency generating means may be employed; but it is considered preferable to use some one of the well known forms of a self-starting vacuum tube power oscillator having a frequency stabilization within range of the filter limits. Since oscillators of this type are well known in the art, such oscillators designated OSC—$f1$, OSC—$f2$ and OSC—$f3$, as the generating means for the frequencies $f1$ and $f2$ in the control office and the frequency $f3$ at the field station, have been shown schematically in block form.

In the particular arrangement shown, these oscillators are normally inactive, and are set into operation by connecting a suitable source of voltage BB to the output plate circuit of the oscillator, which is coupled to the line circuit through a coupling transformer TF connected across the line circuit through the usual coupling condensers. The two oscillators OSC—f1 and OSC—f2 for the frequency f1 and f2 in the control office in Fig. 1A are controlled through front contacts 5 and 6 of transmit relays P1 and P2; and at the field station the oscillator OSC/3 for frequency f3 is controlled through a front contact 7 of a pulsing relay PL and a front contact 8 of a pulsing repeater relay PLP, which is energized by an obvious circuit through a back contact 9 of relay PL. It can be readily seen that, when the pulsing relay PL at the field station in Fig. 2A is energized, the oscillator OSC—f3 for frequency f3 is rendered effective to deliver a pulse of frequency to the line circuit, until the repeater relay PLP releases, the duration of this pulsing being determined by the release time of the relay PLP.

The impulses of carrier frequency applied to the line circuit energize suitable frequency responsive means in the control office and at each of the field stations. In the case where pulses of the frequency f3 are received from the field stations, these pulses are supplied through the coupling transformer TF in the control office to a suitable band-pass filter BP—f3 for the frequency f3, shown schematically in block form, provided both of the control office impulsing relays P1 and P2 are deenergized at the time to close their back contacts 10 and 11. The output of this filter BP—f3 is connected to a suitable amplifier AMP, and thence to suitable relay means. This relay means in the control office is preferably adapted to respond to pulses of short duration; and although any device suitable for this purpose, including an electronic means, may be employed, there is shown a polar magnetic-stick type of sensitive relay M with two windings, which operates quickly in response to the energization of its upper winding as a result of a short pulse of the frequency f3 to move its armature and contact fingers shown conventionally from the normal position shown to the right-hand dotted position, and which acts to hold its contact fingers in this operated position until restored by energization of its lower winding from a local source in a manner later explained.

In connection with this transmission of pulses of the frequency f3 from the field stations, there are conditions later described where two or more field stations may be applying such pulses at substantially the same time during the station selecting and registration part of an indication cycle; and since these field stations have different oscillators for generating the frequency pulses, there is the possible contingency that a certain phase relation of these pulses of identically the same frequency are applied at the same instant by different field stations to create a condition where such pulses in effect neutralize each other at the control office and fail to operate the message relay M. Although the oscillators at the different field stations may be constructed and coupled to the line circuit in such a way as to tend to operate at the same frequency, the variable distances between field stations and the control office encountered in practice, and the phase shift resulting from the line circuit characteristics, does not always assure the energy at the effective operating level will be received at the control office when certain field stations are applying a pulse of the frequency f3; and it is contemplated in accordance with this invention that no attempt will be made to synchronise the oscillators of the field stations, but rather allow these oscillators to operate at their own individual frequency and in such time phase relation as they happen to start. In this connection, it can be appreciated that the existence of complete phase opposition and neutralization of the energy received at the control office from different stations is extremely remote, where there is necessarily slight variations in the frequency generated by these different oscillators and their phase relationship, as well as the time at which these oscillators actually start transmission. Even if such phase cancellation should occur, and the control office should fail to receive a pulse created at different field stations, such field stations would drop out, as later explained, and merely an idle or ineffective indication cycle would result; and it is most unlikely that the same phase relation and other conditions causing such phase cancellation would exist on the next or some other subsequent cycle, so that in due time the indications from the stations in question would be properly received.

Since the filter BP—f3 and amplifier AMP controlling the relay M is disconnected by contacts 10 and 11 from the line circuit when either relay P1 or P2 is energized to apply the frequency f1 or f2 to the line circuit at the control office, this filter associated with the relay M does not have to discriminate against the frequency f1 or f2 at a high energy level, but merely has such filtering characteristics as are needed to protect the relay M against false operation by the other facilities on the same line circuit.

The impulses of frequencies f1 or f2 or both transmitted from the control office to the field stations during the operating cycles are employed to energize receiving relays F1 and F2 of the neutral type at each field station through band-pass filters BPf1 and BPf2 and power amplifiers AMP in a similar way, as shown in Fig. 2A. In this case, both of the filters are effectively disconnected from the line circuit by a back contact 14 of the pulsing relay PL and a back contact 15 of the pulsing relay PLP, while a pulse of the field frequency f3 is applied by the operation of relays PL and PLP, as can be readily understood.

It may be explained at this point that, although the receiving relays F1 and F2 at each field station are effectively disconnected from the line circuit at that station whenever the field of frequency f3 is applied, a pulse of the frequency f3 applied to the line circuit at such station at a high energy level suitable to reach the control office will also be transmitted to a nearby station at which the filters and amplifiers for relays F1 and F2 may be still effectively connected to the line circuit. Since the filter and amplifier for each of the receiving relays F1 and F2 must have sufficient sensitivity to respond to frequencies received at a relatively low energy level from the distant control office, it can be seen that the intensity of the pulse of frequency f3 received from a near-by field station may well be much greater than that for which the relays F1 and F2 are designed to respond. In other words, a field station, particularly one remote from the control office, may have a strong pulse of the frequency f3 applied thereto from a nearby field station tending to energize improperly the relay F1 or F2; and for these reasons the filters associated with the relays F1 and F2 at the field stations have to be designed to discriminate against pulses of a different frequency f3 at a high energy level, as compared with the frequencies f1 and f2 which these filters are designed to pass. Accordingly, as previously noted, it is desirable to employ for the field frequency *f3* one that is sufficiently separated from either of the other frequencies *f1* and *f2* to enable such discrimination to be accomplished effectively.

In this connection, the pulses of the field frequency *f3* are preferably made as short as practicable and still obtain satisfactory response of the receiving means, such as the relay M at the distant control office; and with such short pulses of the field frequency *f3*, the receiving relays F1 and F2 at the field stations may be constructed to be too slow in their operation to respond to such pulses, particularly at the reduced energization permitted by the associated filters. Also, if desired, the coupling transformer 1TF, or some other element involved in the effective operation of the relay F1 or F2 from line circuit energy, may be designed to permit passage of a limited amount of energy to the amplifier, by core saturation or otherwise, so that substantially the same energy level of frequency is applied to the amplifier and relay irrespective of the intensity of the frequency on the line circuit. It may be added that such cross-fire effect in the energization of a receiving relay F1 or F2 at one field station by a pulse of the field frequency *f3* at a near-by station should be avoided, because such operation of the relay F1 or F2 will tend to cause premature or improper stepping action.

In addition to the equipment just described for applying and receiving carrier frequencies on the line circuit, the control office equipment in Figs. 1A and 1B includes a line repeater relay FP, cycle marking relay CY, a clear-out relay CO, a bank of stepping relays V1—VL and an associated half-step relay VP of the usual type, a manually operable start button 1PB (one for each station) and associated repeater stick relay 1PBR and code determining relay 1CD, a master relay CDS associated with the code determining relays such as 1CD, a plurality of control levers represented by the typical control lever SWL, a relay C for initiating a control cycle, a relay FC energized by a field start for initiating an indication cycle, a group of station registration relays represented by the relays 1SR and 2SR, and a number of indication responsive devices, represented by the indication magstick relay 1TK, together with other parts and circuits more conveniently discussed in describing the operation.

Referring to Figs. 2A and 2B, the typical field station equipment includes a line repeater relay 1FP, a cycle marking relay 1CY, a lockout relay 1L, a back of stepping relays 1V1—1VL, and associated relay 1VP, station selecting relays 1SI and 1SO for indication and control cycles respectively, a plurality of control responsive devices represented by the typical control magstick relay WZ, and a plurality of devices to be indicated in the control office represented by the track relays 1TR and 2TR, together with a change relay 1CH and a repeater relay 1CHP for providing a field start.

The banks of stepping relays V1 to VL, and the associated half-step relay VP, in the control office and at each field station, are operated by the intermittent energization of the line repeater relay FP in the same manner described in detail in prior patents, such as Judge, No. 2,138,863, December 6, 1938, and Preston, No. 2,082,466, June 1, 1937; and it will be sufficient for an understanding of the present invention to point out briefly the conditions under which these stepping relays V1—VL and the half-step relay VP are operated with respect to the energization and deenergization of the line circuit during the "on" and "off" intervals, without tracing in detail the various circuits involved.

Considering briefly the operation of the step-by-step devices in the form of the stepping relay bank and half-step relay VP as shown in the control office in Figs. 1A and 1B, all of these relays are deenergized as shown in the normal at-rest condition of the system. During the first energization of the line circuit from the control office during the conditioning period, the relay VP is energized by a circuit readily traced through front contacts 16 and 17 of relays FP and CY, and back contacts of the stepping relays, and is maintained energized by a stick circuit through its front contact 18 to prepare a circuit by which the first step relay V1 is energized during the first "off" interval or deenergization of the line circuit at the control office. The release of the relay FP in this "off" interval, with the relay VP energized, causes energization of the first step relay V1 through a front contact 19 of relay CY and a back contact 20 of relay FP; and the step relay V1 is held up by a stick circuit through front contact 19 of relay CY until the end of the cycle. During the next "on" period, or energization of the line circuit with the frequency *f1* or *f2* from the control office, the resultant energization of the relay FP causes the relay VP to drop and prepare an energizing circuit for the next step relay V2. The same operation is repeated for any desired number of steps.

Thus, as indicated in the diagram of Fig. 3, the half-step relay VP is picked up and released during the alternate "on" intervals, while the step relays V1, V2, etc. are successively energized during the "off" intervals.

The control office also includes a relay E intermittently energized by the operation of the stepping relays V1—V1 and the half-step relay VP in a manner described, for example, in the patent to Hailes et al., No. 2,090,912, August 24, 1937. Briefly stated, and as indicated in diagram of Fig. 3, the relay E is energized each time the half-step relay VP shifts, i. e., becomes energized or deenergized, and the relay E released when the next step relay V1, V2, etc., is energized. In short, the relay E goes up and down alternately in response to the operation of the stepping relays in the control office, and serves to control the operation of the transmit relays P1 and P2, as later explained, to form the "on" and "off" intervals of energization and deenergization of the line circuit from the control office.

TYPICAL OPERATIONS FOR THE SYSTEM

Under the normal at-rest condition, when the system is not operating to transmit controls or indications, the line circuit is deenergized, and most of the relays in the control office and at the various field stations are also deenergized. The cathodes for the oscillators and amplifiers are of course heated ready for operation of these devices when required.

The system may be set in operation to transmit controls from the control office to a selected field station by a manually actuated start on the part of the operator, and to send indications to the control office from a field station by an automatic field start pulse transmitted from such field station upon a change in the position or condition of some device, such as a track relay, at that field station requiring transmission of a new indication to the control office.

The system is simplex in its operation and transmits either controls or indications during an operating cycle; and the nature of each operating cycle is determined by the character of the code element sent from the control office during the initial energization of the line circuit, conveniently termed the conditioning period.

Since the operation of the system for a control cycle and an indication cycle is somewhat different, typical operating cycles for transmission of controls and for transmission of indications will be described separately.

Typical operating cycle for controls

Before considering in detail the operation of the relays and the circuits involved for a typical operating cycle for transmission of controls from the control office to one selected field station, it will be helpful to survey briefly the general functions performed during such a cycle.

When a particular field station, and the particular controls to be transmitted to that field station, have been identified by manual manipulation on the part of the operator in the control office, the apparatus at the control office acts to send out a predetermined frequency, assumed to be frequency $f2$ in the specific arrangement shown; and this conditions the apparatus at the control office and all field stations for an operating cycle by energization of a cycle marking relay CY and other relays, including a control cycle relay C (Fig. 1A) in the control office and a station selecting relay such as 1SO (see Fig. 2B) at each of the field stations to identify the operating cycle as a control cycle.

Following this conditioning period, and when the line circuit is deenergized in the control office, the first step relay V1 is picked up in the control office and at all the field stations. The line circuit is then energized at the control office with the frequency $f1$ or $f2$, as the case may be, in accordance with the character of the first code element of the code call belonging to the field station to which controls are to be transmitted; and such energization of the line circuit acts to drop out the station selecting relay such as 1SO at all of the field stations whose code calls do not match. This same operation is repeated for as many station selecting steps as required by the number of stations involved, only two such steps being shown, after which a station selecting relay such as 1SO remains energized at only the particular station identified in the control office as the one to receive controls during this particular operating cycle.

After one field station has thus been selected, each energization of the line circuit with the frequency $f1$ or $f2$ during subsequent steps is in accordance with the controls to be transmitted and causes operation of control devices, such as the magstick relay 1WZ in Fig. 2B, to conform with these controls, thereby governing the operation of the switches and signals at this field station in the manner desired by the operator.

After the control office has intermittently energized and deenergized the line circuit for the prescribed number of step intervals, depending upon the number of stations and controls, the energization of the last step relay VL energizes a clear-out relay CO at the control office, which applies both frequencies $f1$ and $f2$ to the line circuit simultaneously for a clear-out control, which deenergizes the cycle marking relays CY and other relays at the control office, and all field stations, to restore the system to the normal condition, ready for another operating cycle.

With this general explanation, consideration may now be given to the detail circuits and relay operations involved in preparing these functions.

*Manual start.*—Since controls in accordance with the positions of switch and signal levers or the like can be transmitted to only one station at a time, and since it is desirable that the operator be able to manipulate these levers at any time he wishes, it is desirable to provide suitable means for causing the system to act automatically to send out controls to field stations one at a time in some predetermined order, regardless of when the operator may happen to manipulate the control levers and actuate start buttons relating to the respective stations. This is accomplished in the organization shown by a group of manually operable start push buttons such as 1PB, one for each field station, with an associated repeater relay such as 1PBR, and a code determining relay such as 1CD, together with a master relay CDS and interconnecting circuits, in the manner shown and described, for example, in the prior patent to Hailes et al., No. 2,259,561, October 21, 1941.

Figure 4A:
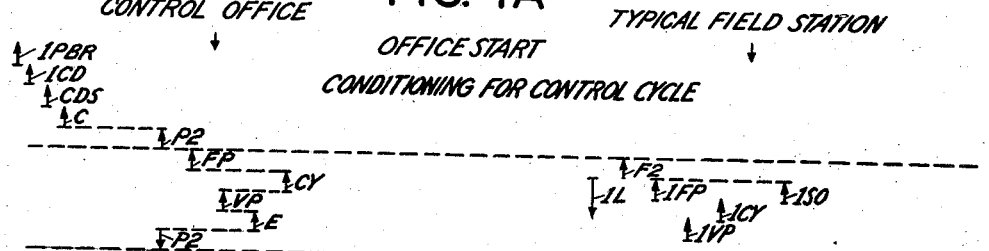

As a typical example of such operation, assume that the operator, after having positioned the control levers belonging to the typical field station shown, pushes the start button 1PB for this station. Referring to Fig. 4A illustrating the resulting sequence of relay operation, the actuation of button 1PB energizes the associated repeater relay 1PBR by a circuit readily traced on the drawing (see Fig. 1B) through a contact 24 of the push button 1PB and a cancel button CNB, which is preferably provided to enable the operator to stop transmission of controls set up prematurely or by mistake. The relay 1PBR sticks through its front contact 25 and a back contact 26 of its associated code determining relay 1CD.

Assuming that no other code determining relay such as 1CD for any other station is energized at this time, the energization of relay 1PBR establishes a pick-up circuit through the upper winding of the associated relay 1CD which may be traced from (+), through the back contact 27 of relay CY in Fig. 1A, wire 28, back contact 29 of relay CDS in Fig. 1B, front contact 30 of relay 1PBR, upper winding of relay 1CD, and cancel button CNB, to (—).

In this connection, while only one relay 1CD is illustrated, it should be understood that there are a number of such relays, one for each field station, and that the pick-up circuit for each of these relays includes a back contact, such as 30 for relay 1PBR shown, of certain other push button repeater relays belonging to other field stations, in such a way that these relays such as 1CD are energized only one at a time in a prescribed order determined by their electrical connections. The relay 1CD for the one station shown is assumed to have preference over all others, since their pick-up circuits (not shown but partially indicated at 31) are broken at the back contact 30 of the associated relay 1PBR.

The energization of the code determining relay 1CD opens its back contact 26 to release the relay 1PBR, but at the same time a front contact 32 of relay 1CD establishes a stick circuit through its lower winding in series with the master relay CDS which may be traced from (+), through back contact 34 of relay C in Fig. 1A, in multiple with a back contact 35 of relay CO, also in multiple with a back contact 36 of relay CY, wire 37, winding of relay CDS in Fig. 1B, front contact 32 of relay 1CD, its lower winding, and through cancel button CNB, to (—). The energization of the master relay CDS opens at its back contact 29 the pick-up circuits for all of the other code determining relays for the stations, so that no other relay such as 1CD can be energized.

The energization of the master relay CDS in this manner, in connection with the energization of a code determining relay such as 1CDS to identify the station to which controls are to be transmitted, closes a front contact 38 to energize the control cycle relay C in Fig. 1A over a circuit which may be traced from (+), through front contact 38 of relay CDS in Fig. 1B, wire 39, relay C, back contact 40 of relay FC, to (—).

It may be noted here that the back contact 40 of relay FC is included in this energizing circuit for the control cycle relay C, in order to provide the necessary interlock in case a field start pulse is received before or at about the same time the operator manually actuates a start button 1PB. If the field start pulse is received in the control office to energize relay FC, in a manner later explained, before relay C is energized by the manual start, then the manual start is not effective for that particular cycle.

The master relay CDS, when once energized, is maintained energized until the end of the current operating cycle, and the control cycle relay C is likewise maintained energized to the end of this cycle.

*Conditioning period for a control cycle.*—Still referring to the sequence diagram of Fig. 4A, the energization of the control cycle relay C of Fig. 1A in the control office establishes a circuit for energizing the relay P2 in the control office to render the oscillator for frequency *f2* active to apply this frequency to the line circuit, the energizing circuit for the transmit relay P2 under these conditions being traced from (+), through the back contact 42 of relay E in Fig. 1A, through front contact 43 of relay C, wire 44, through back contacts 45 to 49 in series of the stepping relays VL—VI, and a connection 50 from the back contact of step relay VI to *f2* bus, and through the winding of relay P2 in Fig. 1A, to (—).

This energization of the transmit relay P2, for applying the frequency *f2* to the line circuit, closes an energized circuit for the line repeater relay FP in the control office from (+), through a back contact 51 of relay P1 and a front contact 52 of relay P2 through the winding of relay FP, to (—). This energization of the relay FP closes a pick-up circuit for the cycle marking relay CY, from (+), front contact 53 of relay FP, relay CY to (—); and relay CY is then stuck up by a stick circuit including its front contact 54 and back contacts 55 and 56 in multiple of the relays P1 and P2.

The energization of the cycle marking relay CY in Fig. 1A in the control office and closure of its front contact 16 establishes a circuit through front contact 17 of relay FP to pick up the relay VP in Fig. 1B, which in turn causes energization of the relay E in Fig. 1A to open its back contact 42 and interrupt the energizing circuit for the transmit relay P2 for frequency *f2* previously described, thereby terminating the conditioning period.

During this conditioning period, all of the field stations are conditioned to receive a control cycle; and a description of this operation for the typical field station shown in Figs. 2A and 2B applies to all the field stations. Referring to Fig. 2A, the transmission of the frequency *f2* from the control office energizes receiving relay F2 which, among other things, operates its contact finger 60 to close a front contact, while the contact finger 61 of relay F1 remains in its deenergized position, and establishes a pick-up circuit for the relay 1SO, which may be traced from (+) through back contact 62 of relay 1CY, front contact 63 of relay 1L, back contact 61 of relay F1, front contact 60 of relay F2, *f2* bus, through back contacts 64—68 of the stepping relays VL—VI in Fig. 2B, wire 69, through winding of relay 1SO and back contact 70 of relay 1S1, to (—).

This pick-up circuit for the relay 1SO is established only momentarily, because both the back contact 62 of relay 1CY and front contact 63 of relay 1L operate shortly after the relay F2 picks up, as presently explained; but as soon as the relay 1SO is energized, it closes a front contact 72 to supply current to this circuit in multiple with the back contact 62 of relay 1CY and front contact 63 of relay 1L, and thus maintain relay 1SO energized so long as relay F2 is energized.

The energization of the receiving relay F2, in response to the conditioning frequency *f2* for a control cycle, opens at its back contact 73 a stick circuit through the lower winding of relay 1L from (+), through back contact 74 of relay F1, back contact 73 of relay F2, front contact 75 of relay 1L, through its lower winding, to (—). The relay 1L is preferably made slightly slow releasing, as indicated, so that there is time for energization of the relay 1SO over the pick-up circuit previously traced.

The energization of the receiving relay F2 also picks up the line repeater relay 1FP by a circuit from (+), through back contact 77 of relay F1, front contact 76 of relay F2, winding of relay FP, to (—).

The energization of the line repeater relay 1FP in turn picks up the cycle marking relay 1CY by a circuit from (+), through front contact 78 of relay 1FP, front contact 79 of relay 1L, and winding of relay 1CY, to (—); and the relay 1CY is held up by a stick circuit until the end of the current cycle through its own front contact 80 and back contacts 81 and 82 in multiple of the receiving relays F2 and F1.

The energization of the relay 1CY and closure of its front contact 62, while the relay 1FP is also energized to close its front contact 84, causes energization of the relay 1VP in Fig. 2B to condition the stepping bank for operation, in the same manner as in the control office.

Figure 4B:
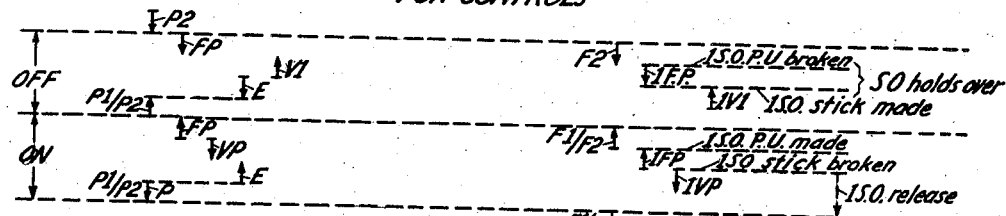

*Typical station selecting step.*—Fig. 4B is the sequence diagram for this operation. When the line circuit is deenergized at the control office to terminate the conditioning period, the repeater relay FP in the control office and the repeater relays such as 1FP at all the field stations release, and the first step relay V1 is energized in the usual way characteristic of the stepping banks shown, as described more in detail in the prior patent to Judge, No. 2,138,863, December 6, 1938.

In the control office, this energization of the first step relay V1 establishes circuit connections to permit energization of the transmit relay P1 or P2 in accordance with a first code element of the code call for the field station to which the controls in question are to be transmitted. As a typical example of this operation, and assuming the code determining relay 1CD shown is energized, with code connection as shown, the circuit for energizing the transmit relay P1 upon the energization of the first step relay V1 may be traced from (+), through back contact 42 of relay E in Fig. 1A, front contact 43 of relay C, wire 44, through back contacts 45—48 of step relays VL—V2, front contact 49 of step relay V1, code bus 86, through front contact 87 of relay 1CD, code connection 88 to the f1 bus, through the transmit relay P1, to (—).

The operation of the transmit relay P1, and the resultant energization of the relay FP in the control office, releases relay VP in Fig. 1B, and with relay V1 energized, establishes a circuit to pick up the relay E in Fig. 1A to open its back contact 42 to terminate this energization of the line circuit with the frequency f1.

Considering now the operation occurring at the field stations as a result of the energization of the line circuit with a particular frequency f1 corresponding with the first code element of the code call for the field station being selected, it is convenient to explain first how the station selecting relay 1SO for the typical station shown is maintained energized under these conditions, due to the fact that it is the station being selected. When the receiving relay F2 releases at the end of the conditioning period, it opens at its front contact 60 the control stick circuit then energizing the relay 1SO; but very quickly thereafter this same relay F2 establishes an auxiliary stick circuit to hold up the relay 1SO during the subsequent "off" interval, this circuit being traced from (+), through back contact 74 and 73 of relays F1 and F2, back contact 75 of relay 1L, front contact 90 of relay 1SO, and back contact 70 of relay 1SI to (—).

In other words the control stick circuit for the relay 1SO, which is dependent upon the energization of the receiving relay F2 in the case under consideration, is broken just before an auxiliary stick circuit for this relay 1SO is made up through the back contact of the same relay F2; and while the contacts of the relay F2 may be adjusted to perform a make-before-break function, the relay 1SO is preferably made slightly slow releasing by the use of a rectifier as shown, or by equivalent means, so as to hold its armature in the attracted position and maintain its front contacts closed during the brief interval required for the contact fingers of the receiving relay F2 to move between their front and back contacting positions, as diagrammatically indicated in the sequence diagram of Fig. 4B.

Upon energization of the line circuit with the frequency f1 for station selection purposes, the energization of the receiving relay F1 opens the stick circuit for relay 1SO above mentioned through its front contact 90; but at substantially the same time the front contact 61 of the relay F1 closes to provide a control stick circuit for the relay 1SO through a code jumper effective with the step relay V1 energized, this circuit being from (+), through front contact 72 of relay 1SO, back contact 60 of relay F2, front contact 61 of relay F, f1 bus, back contacts 92—95 of step relays VL—V2, front contact 96 of step relay V1, code jumper 97, stick bus 98, and front contact 90 of relay 1SO through its winding and back contact 70 of relay SI, to (—).

When the receiving relay F1 releases upon termination of this "on" interval and breaks the control stick circuit through the code jumper 97 above mentioned, the auxiliary stick circuit for the relay 1SO is established as soon as this relay F1 closes its back contact 74; and as above noted, the relay 1SO is made sufficiently slow releasing to hold over this relatively short interval between breaking a front contact and closing a back contact on the same relay F1.

Considering now the operation at field stations having code calls which do not match that being transmitted from the control office, it can be seen that, when the receiving relay F1 at such stations opens at its back contact 74 the auxiliary stick circuit for its relay such as 1SO, that relay at each of these stations at once releases, because the code jumpers at these stations do not provide the necessary contol stick circuit for such relay. The release of a station selecting relay such as 1SO at any field station in this manner opens its front contact 72 to prevent its energization on any subsequent step, where the code element transmitted in the way of frequency f1 or f2 may happen to match the code jumper. Also, the release of the station selecting relay such as 1SO at any station opens at its front contact 100 the pick-up circuits for the stepping relays, so that further stepping operation stops at such rejected station.

The same operation of applying an impulse of the frequency f1 or f2, in accordance with the code characters associated with the code determining relay such as 1CD then energized, may be carried out for as many station selecting steps as desired, only two being shown; and the same operation of holding up or releasing station selecting relays such as 1SO is repeated for the successive code elements of the station code call, until there is only one station selecting relay such as 1SO left energized at the particular selected field station, the others having been released during some one of the previous station selecting steps, in a manner which can be readily appreciated without further explanation.

After the last "on" period for station selection (two being used in the particular simplified arrangement shown), the energization of the next step relay such as V3 during the next "off" period connects (+) through its front contact 101 to the stick bus 98 to hold up the station selecting relay such as 1SO at the particular station selected.

*Transmission of a typical control.*—After the station selecting steps, the transmission of frequency f1 or f2 on the succeeding steps is determined by the position of the switch and signal levers or the like; and an explanation of the operation of transmitting one typical control, in accordance with the position of the lever SWL shown, will serve to make clear how any desired number of controls may be transmitted to a selected field station.

Figure 4C:
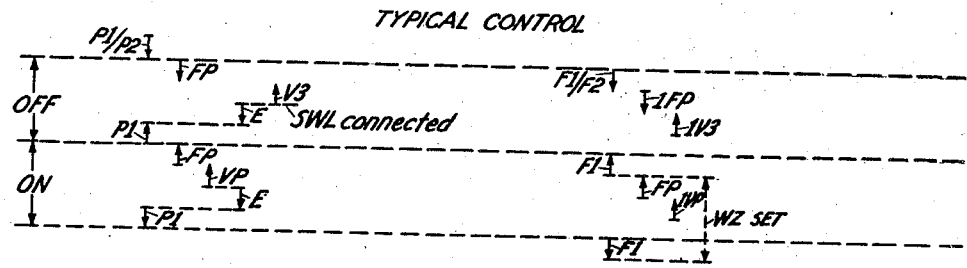

Referring to Fig. 1B, and sequence diagram of Fig. 4C, the energization of the step relay V3 following the transmission of the last station selecting impulse in a simplified arrangement shown, renders the position of the lever SWL effective to determine whether transmit relay P1 or P2 shall be energized. Assuming the lever SWL to be in the position shown, it can be seen that the f1 bus is energized through the contacts of this lever, front contact 102 of relay 1CD, code bus 103, and front contact 47 of step relay V3. Thus, in the arrangement shown, an impulse of the frequency f1 is transmitted for a switch control.

Referring to the field station apparatus in Figs. 2A and 2B, the energization of the receiving relay F1 in response to the impulse of frequency f1, resulting from the energization of transmit relay P1, establishes a circuit through the upper winding of the mag-stick relay WZ of Fig. 2B through front contact 94 of step relay V3, this circuit being from (+), through front contact 72 of relay ISO, still energized at the selected station in question, back contact 60 of relay F2, front contact 61 of relay F1, f1 bus, back contacts 92, 93 of step relays VL and V4, front contact 94 of step relay V3, upper winding of mag-stick relay WZ, return bus 105 through front contact 106 of relay ISO, to (—).

This flow of current through the upper winding of the magstick relay WZ positions its contact fingers to a position corresponding with the control lever SWL in the control office, and effecting the desired control of a switch or other device connected thereto. A magnetic stick type relay WZ with two separate operating windings, which acts to hold its contact fingers in the last operated position until changed, has been illustrated in the interests of simplicity; but the same control circuits may be employed to govern the energization of separate neutral relays with decoding relays and execution circuits in the manner disclosed for example, in the patent to Wells, No. 2,159,922, May 23, 1939.

It can be readily seen that a similar operation may be repeated for another control upon energization of the next step relay V4, and for as many other control steps as desired.

*Clear-out after a control cycle.*—From the foregoing explanation it can be seen that the stepping operation is performed in this system in response to intermittent energization and deenergization of the line circuit at the control office; and when the stepping bank in the control office has taken the prescribed number of steps, depending upon the capacity of the system, and the last stepping relay LV is energized, a quick clear-out or restoration to normal is accomplished by energizing the line circuits simultaneously with frequencies f1 and f2.

Figure 4D:
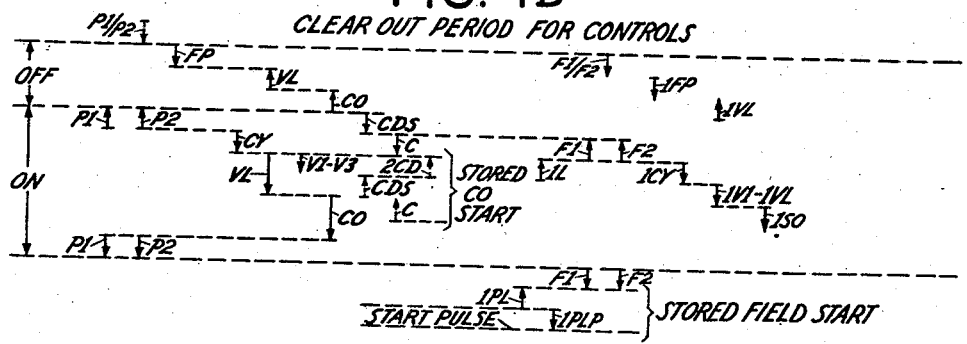

Considering this operation more in detail, and referring to sequence chart for the clear-out period in Fig. 4D, the energization of the last stepping relay LV in Fig. 1B at the control office closes a front contact 108 to apply (+) to a wire 109, connecting to the clear-out relay CO in Fig. 1A, thereby energizing this relay CO to close its front contacts 110 and 35 and energize both of the transmit relays P1 and P2 at the same time. The opening of both the back contacts 56, 57 of these relays P1 and P2 opens the stick circuit for the cycle marking relay CY; and since the relay FP is not energized with both of the front contacts 51 and 52 of these relays P1 and P2 closed, this cycle marking relay CY is automatically released, opening its front contacts 16 and 19 to restore the VP relay and stepping relays V1—VL to their normal conditions.

The release of the last step relay VL opens its front contact 108 to deenergize the relay CO; and relays VL and CO are preferably slightly slow acting in releasing as indicated, for timing purposes later discussed. The ultimate release of the relay CO opens its contacts 34 and 110 to release the transmit relays P1 and P2, and terminate the conditioning period.

Referring to the apparatus at the field stations, the energization of both receiving relays F1 and F2 at the same time drops the cycle marking relay such as 1CY at each field station by opening at the back contacts 81 and 82 of relays F1 and F2 the stick circuit for the relay 1CY, while the relay 1FP fails to pick up. This restores the stepping relays 1V1—1VL and half-step relay 1VP to normal in the same way as in the control office.

Also, the simultaneous energization of the receiving relays F1 and F2 at each field station establishes a pick-up circuit through the upper winding of the lockout relay such as 1L at each of these field stations readily traced through the front contacts 73 and 74 in series of the relays F1 and F2. When the receiving relays F1 and F2 both release at the end of the clear-out period, the stick circuit through the lower winding of relay 1L is established through back contacts 73, 74 in series of these relays F1 and F2 and front contact 75 of relay 1L.

The station selecting relay such as ISO at the particular field station selected for the control cycle in qeustion releases when step relay V3 drops, and opens its front contact 101, the stick circuit through its front contact 72 being open because both front contacts 60, 61 of relays F1 and F2 are closed, and its auxiliary stick circuit through its other front contact 90 being broken at the back contacts 73 and 74 of relays F1 and F2.

In this way, the apparatus at all field stations is restored to the normal at-rest condition at the end of a control cycle relatively quickly by the operation of quick acting relays, as distinctive from the clear-out operation ordinarily employed and involving a prolonged deenergization of the line circuit to release slow acting relays. Also, since slow release relays are not employed for clear-out purposes, the conditioning period may be made shorter than required for the energization of such relays. It can be readily appreciated that such shortening both the conditioning and the clear-out periods for an operating cycle in accordance with this invention materially shortens the duration of the complete cycle, and speeds up the operation of the entire communication system.

*Emergency clear-out.*—Provision is made in the system of this invention for automatically causing the same clear-out operation by energization of the relay CO, in the event the line circuit should be come steadily energized or deenergized during an operating cycle, due to an open code bus or some other fault. Since such faulty condition of the circuits may be of a transitory nature and may disappear upon some subsequent operation, or may involve apparatus relating to only one of the several stations, it is desirable in the interests of facility to provide an automatic clear-out under such conditions, rather than leave the system stalled until some special manual manipulation or repair is made.

Referring to Fig. 1A, two slow release relays SX and OC are governed by the line repeater relay FP and impulsing relay E, so that the relay OC is released if there is a sustained energization of the line circuit, and the relay SX and in turn relay OC are released if the line circuit becomes deenergized during an operating cycle for a prolonged period. The release of the relay OC in either case, and closure of its back contact 113 establishes a circuit, readily traced through front contact 36 of relay CY and wire 114 for energizing the clear-out relay CO, which acts to restore the apparatus in the control office and at each field station to the normal condition in the regular way.

Considering the control of these relays SX and OC more in detail, under the normal condition shown, the relay SX is maintained energized by a circuit from (+), through back contact 16 of relay CY, and the relay OC is maintained energized by a circuit through a back contact 115 of relay FP, and a front contact 116 of relay SX. When the relay CY is energized at the beginning of an operating cycle, the relay SX starts to time, and if the line repeater relay FP is not energized during the conditioning period, or at frequent intervals thereafter during the operating cycle, to close its front contact 115 and re-energize the relay SX, it opens its front contact 116, and starts timing of the relay OC, which in turn will cause the automatic clear-out.

Thus, if during an operating cycle the cancel button CNB should be operated, or a broken wire or defective contact should prevent the energization of a code bus to pick up the transmit relay P1 or P2, the resultant failure to energize the line circuit causes the relays SX and OC to release in turn and cause an automatic clear-out operation.

If, however, there should be some broken wire or bad contact in connection with the stepping relays to prevent energization of the impulse relay E to cause de-energization of the line circuit during an operating cycle, the energizing circuit for the relay OC is open at the back contact 115 of relay FP and front contact 42 of relay E, so that this relay OC times out and produces the automatic clear-out control.

Thus, if there should be a sustained energization or deenergization of the line circuit during an operating cycle, on account of certain circuit faults, an automatic clear-out operation is effected to restore the system to the normal condition, ready to carry out a subsequent operating cycle, if such may be done under the existing faulty conditions.

*Stored manual starts.*—As previously noted, the slow release characteristics of the last stepping relay VL and the clear-out relay CO are employed during the clear-out period for timing purposes, and in order that any manual field start in the control office then existing and stored may be at once effective to assure a succeeding control cycle without delay.

Considering this feature more in detail, and referring to the apparatus in the control office and the sequence chart for the clear-out period in Fig. 4D, the energization of the clear-out relay CO and opening of its back contact 35 in Fig. 1A breaks the stick circuit over wire 37 to the code determining relay, such as 1CD, then energized, because the back contacts 36 and 34 of the relays CY and C in this stick circuit are open at this time. The master relay CDS in series in this stick circuit is also released, and in turn releases the control cycle relay C to close its back contact 34 and prepare a stick circuit for another code relay such as 1CD, which may thereafter be picked up due to the energization of its associated push button repeater relay such as 1PBR, when the cycle marking relay CY later releases and closes its back contact 27.

Thus, if a manual start has been set up in the control office by the energization of a push button repeater relay such as 1PBR, at the end of an operating cycle then in effect, the code determining relay such as 1CD for the corresponding station, the master relay CDS, and the control cycle relay C are immediately energized during the clear-out period to call for a control cycle. In such a case, when the clear-out relay CO releases, the transmitter relay P2 is held energized over the circuit previously described for initiating a conditioning period for a control cycle; and consequently, this conditioning period occurs immediately after the other transmitter relay P1 releases to change the energization of the line circuit from both frequencies $f2$ and $f1$ to the frequency $f2$ alone.

In other words, where a manual start exists in the control office at the end of an operating cycle, a control cycle immediately follows without any deenergization period, the energization of the line circuit with the frequency $f2$ alone acting to condition the system for transmission of controls the same as if this frequency $f2$ were applied after a period of line circuit deenergization.

This feature of permitting the control office to set up conditions for a control cycle during the clear-out period of an existing cycle either of controls or indications not only avoids a time interval between succeeding cycles, but also gives definite preference to a control cycle and obviates any race or conflict between a manual start in the control office and a field start from some field station, it being impossible for any field station to send such a field start pulse until the line circuit is wholly deenergized and both receiving relays F1 and F2 are deenergized, as will be presently explained.

The foregoing explanation will serve, it is believed, to make clear how the system of this invention operates to select a particular field station and send controls to that field station in accordance with manual manipulation of control levers and start buttons by the operator in the control office, and also provide an automatic emergency clear-out and the desired preference to control cycles.

*Operation for a typical indication cycle*

The operation of the system during an indication cycle for transmitting indications from a given field station to the control office involves operation of the stepping relays and the like in substantially the same way as during the control cycle; but there are differences in the operation of designating and registering the particular station to send in indications, and other features of the operation which require separate consideration.

In general, an indication cycle is started out with a conditioning period the same as a control cycle, but with the other frequency $f1$. Following such conditioning period, the line circuit is intermittently energized and deenergized to operate the stepping half-step relay VP and step relays V1—VL, and the relay E in the control office the same as during a control cycle; but the frequency character of the successive energizations the line circuit is controlled in a different manner for station selection purposes, and in connection with continuing the stepping operation for transmission of indications.

Briefly outlining the functions for an indication cycle, a change in the position or condition of any device at any field station calling for the transmission of a new indication to the control office, such as the energization or deenergization of a track relay by train movement out of or into a track section, causes such field station to apply a short starting pulse of frequency $f3$ to the line circuit, which acts in the control office to energize a field control relay FC to initiate operation of the system for an indication cycle.

Since indications can be received in this type of system from only one field station at a time during an operating cycle, and since it may well happen that conditions calling for the transmission of new indications may exist at more than one station at a time, some suitable means must be provided to exercise a preference or priority as between such plurality of field stations attempting to transmit indications at the same time, in such a way that these stations are rendered effective only one at a time to transmit indications during successive operating cycles.

In the system of this invention, this preference or priority for field station transmission is accomplished in accordance with the general principles of code superiority disclosed in our prior patent No. 2,129,183, September 6, 1938. In a carrier current type system, however, a field station with a superior code call may not be able to effectively exercise its code superiority directly against other field stations by controlling the line circuit condition, as in our prior patent, because the existence of a nodal line circuit deenergization due to the effect of standing waves, in a carrier current system, or the phase opposition of frequencies at a given station as received from different oscillators at other field stations, may preclude response of some station or stations to an energization of the line circuit created at some other station. For these reasons, the principles of code superiority of our prior patent above mentioned are applied differently in the system of this invention by what may be termed in-and-out transmission to and from the control office of the superior code elements called for by the field stations trying to send indications at the same time.

Briefly considering this plan of operation, later described in detail, each field station having new indications to transmit is given opportunity, until dropped out, to send a code element to the control office during each "off" interval in the station selecting portion of the cycle, namely, the first two steps in the simplified arrangement shown. The application of a pulse of frequency $f3$, as distinctive from a non-pulse condition, constitutes the superior code element; and field stations may send in their indications during successive indication cycles in the order determined by the relative superiority of the station code calls allotted to them, the superior field station being the one having a code call requiring the greatest number of requency pulses occurring earliest in the code. For example, in the case of two station selecting steps as shown, and using $p$ to represent a pulse of carrier frequency $f3$, and O to represent the non-pulse condition, the order or preference for the four stations is (1) $p$—$p$; (2) $p$—O; (3) O—$p$, and (4) O—O.

During each of the field station selection or rejection steps, if any one of the plurality of stations in action sends a pulse of frequency $f3$ to the control office, the reception of this pulse of the field frequency $f3$ in the control office causes the control office to respond by transmitting the frequency $f1$, which is arbitrarily taken as a code element superior to the frequency $f2$. The reception of this impulse of the superior frequency $f1$ from the control office, at each of the plurality of field stations then attempting to send in indications, holds up an indication station selecting relay such as ISI at the station or stations having a corresponding superior code element in their code call, but automatically drops out such relay ISI at each field station or stations having a corresponding inferior code element.

If, however, no pulse of field frequency $f3$ is received at the control office from any station, it responds with the other inferior frequency $f2$, which maintains energized the indication selecting relay, such as relay ISI, at any station or stations still having this relay energized.

This same operation of holding or rejecting field stations in accordance with the relative superiority of their code calls may be continued for as many steps as desired, depending upon the number of stations; and at the end of this station rejection period, one station selecting relay, such as relay ISI, is maintained energized at only one sending station, which is then effective to create pulses or non-pulsed conditions of the line circuit with the frequency $f3$ during the subsequent steps for operation of the indicating devices in the control office.

Also, during this station selecting or rejection period, certain station registration relays in the control office are operated in accordance with the station code call re-transmitted from the control office, so that the indications subsequently received from the surviving station are directed to the particular indication storing devices belonging to that station.

The clear-out period at the end of an indication cycle occurs the same as for a control cycle, except that relays FC in the control office and a relay such as ISI is released at the surviving field station, rather than the relays C and ISO previously described which relate to the transmission of controls.

It may be pointed out here that, since the relay, such as relay ISI, for transmission of indications is controlled in the same way as the relay, such as relay ISO, by impulses of frequency $f1$ or $f2$ transmitted from the control office, it is convenient to use the same code call for identifying the field stations for controls and indications, and employ in the same circuits and code jumper connections for governing both relays ISI and ISO.

With this general explanation of the functions for an indication cycle, consideration may be given to the detail circuits and relay operations involved in performing their functions.

Figure 4E:
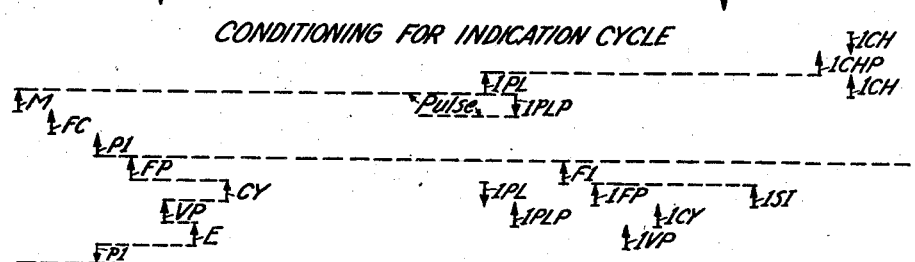

*Field start.*—Referring to Fig. 2B and sequence diagram of Fig. 4E, whenever a change occurs in the device at a field station calling for the transmission of new indications, such as the energization or deenergization of the track relay ITR, a stick circuit for a change relay ICH through its front contact 120 is momentarily broken during the movement of the contact finger 121 of the track relay ITR from one position to the other, so that the fast operating change relay ICH is deenergized. The closing of a back contact 122 of relay ICH establishes an energizing circuit for a repeater relay ICHP, which may be traced from (+), through a back contact 123 of relay ISI, wire 124, also connected to (+) through a back contact 125 of relay IVL, relay ICHP and back contact 122 of relay ICH to (—).

This energization of relay ICHP closes a front contact 126 to provide a stick circuit for itself independently of the relay ICH, and also closes a front contact 127 to provide a pick-up circuit for relay ICH through a back contact 128 of the step relay V3 representing the first indication step, for reasons later explained.

Assuming the system to be in the normal at-rest position as shown, the energization of the relays ICHP in this way provides a circuit for energizing the pulsing relay IPL which may be traced from (+), through back contacts 74 and 73, in series of the receiving relays F1 and F2 in Fig. 2A, front contact 130 of lockout relay IL, wire 131, front contact 132 of relay 1CHP to pulsing bus 133 through relay 1PL to (—).

This energization of the relay 1PL applies a short pulse of the carrier frequency $f3$ to the line circuit as a field start pulse, the oscillator at the field station being disconnected by the opening of front contact 6 of relay 1PLP, and the filters and amplifiers controlling the receiving relays F1 and F2 being rendered effective by the closing of the back contact 15 of relay 1PLP.

Referring to the control office in Fig. 1A, this start pulse of frequency $f3$ acts through the filters and amplifier to operate contact fingers 135 and 136 of the relay M from the left-hand position shown to the right-hand dotted line position. Assuming that no manual field start has occurred in the meantime to energize relay C, this movement of the lower contact finger 136 of relay M establishes a pick-up circuit for the field control relay FC which may be traced from from (+) B, through back contact 137 of relay CY, lower winding of relay FC, through back contact 138 of relay C to (+) B, a suitable resistance being employed if necessary to regulate the intensity of current through the winding of relay FC. The relay FC is then maintained energized by a stick circuit from (+) B, through back contact 139 of relay CO, front contact 140 of relay FC and its upper winding, and back contact 138 of relay C to (—) B.

*Conditioning for indication cycles.*—Thus, in response to a field start pulse, the relay FC for an indication cycle is energized and the upper contact finger 135 of the relay M is operated to the right-hand position. Under these conditions, a circuit is established to energize the transmit relay P1 from (+), through back contact 42 of relay E, back contact 43 of relay C, front contact 142 of relay FC, now energized, contact finger 135 of relay M to the right, and connection 143 to the $f1$ bus relay P1 to (—).

This energization of the transmit relay P1 in the control office energizes the relays FP, CY, VP and E the same as during the conditioning period for a control cycle, as indicated in Fig. 4E. Also, at each field station the energization of the receiving relay F1 operates relays 1FP, 1CY, 1L and 1VP the same as for a control cycle.

The energization of the receiving relay F1 at the field stations, however, does not energize the station selecting relays such as 1SO, which require energization of the relay F2, but at each field station having its change repeater relay such as 1CHP energized, a circuit is established for picking up the relay such as 1SI at these field stations, this circuit being similar to that previously described for energization of the relay 1SO, but including a front contact 61 of relay F1, $f1$ bus, back contacts 92—96 of stepping relays VL—V1, front contact 144 of relay 1CHP, wire 145, relay 1SI, and back contact 146 of relay 1SO to (—).

The relay such as 1SI at each field station for transmission of indications is provided with control and auxiliary stick circuits operating in the same way as those for the station selecting relay like 1SO, so that such relay 1SI remains energized at any field station only so long as the station selecting impulses of frequency $f1$ or $f2$ correspond with the code jumper connections and code call of that station.

The energization of the receiving relay F1 opens at its back contact 74, and the release of the relay 1L later opens at its front contact 130 the circuit for energizing the pulsing relay 1PL upon energization of the associated relay 1CHP. Consequently, as soon as the conditioning period for an indication cycle is started, any subsequent energization of a change repeater relay such as 1CHP at any station other than the station or stations ready to send indications at the time of such conditioning period, is not effective to energize the associated pulsing relay such as 1PL, and create premature or false pulses of the field carrier frequency $f3$ during the ensuing cycle. In this connection, it can be seen that the change repeater relay such as 1CHP may be energized at any station during an operating cycle, whenever a change occurs calling for the transmission of new indications, so that a field start condition is stored ready to render the corresponding field station effective to send in indications on some subsequent operating cycle.

*Station registration.*—In practical operation, often only one field station may have new indications to send to the control office at the time an indication cycle is initiated; and before considering the more complicated situation where it is necessary to exercise a preference or priority as between a plurality of field stations trying to send indications at the same time, it is convenient to explain first the operation of station registration and transmission of a typical indication where only one field station is involved.

Starting with the conditioning period for an indication cycle, and assuming the typical field station shown in Figs. 2A and 2B is the one to be registered in the control office and transmit indications, when the relays 1CHP, 1SI and 1VP are energized during the conditioning period, a circuit is prepared for the energization of the field pulse relay 1PL during the next succeeding "off" period, if the code call allotted to this field calls for such a pulse of the field frequency $f3$, as in the case of the typical field station shown.

Figure 4F:
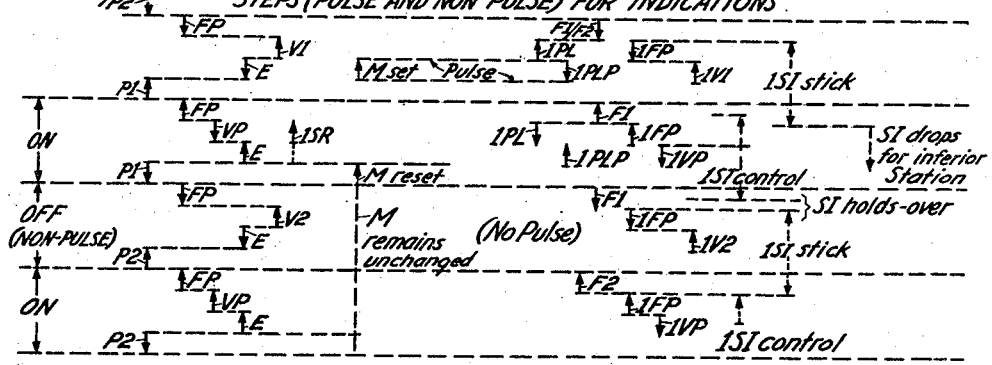
Figure 4G:
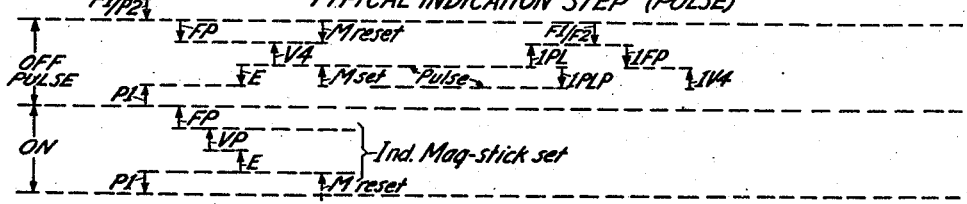

Referring to Fig. 2A and sequence diagram Fig. 4F, when the receiving relay F1 releases at the end of the conditioning period, an energizing circuit prepared for the field pulse relay 1PL is established, which may be traced from (+) through back contacts 74, 73 of relays F1 and F2, front contact 150 of relay 1SI, wire 151, front contact 152 of relay 1VP (see Fig. 2B) now closed, through the back contacts 153—155 of relay 1VL, 1V4 and 1V2, code jumper or connection 156 to the pulsing bus 133, winding of relay 1PL to (—).

This energization of the relay 1PL and the closure of its front contact 7 acts to render the oscillator OSC—$f3$ effective to apply the field frequency to the line circuit; and at the same time the back contact 9 of relay 1PL releases its repeater relay 1PLP to open its contact 8 and terminate this pulse. When the relay 1PL is energized, its back contact 14 opens up the connecting circuits to the filters for frequencies $f1$ and $f2$, but when the repeater relay 1PL drops, these filter circuits are again closed through the back contact 15 of this relay, ready to receive frequency impulses from the control office.

When the receiving relay F1 drops at the beginning of the first "off" period under consideration, it closes at its back contact 74 a stick circuit for the relay 1SI, similar to that heretofore described for the relay 1SO, and which may be traced from (+), through back contacts 75 and 73 of relays F1 and F2, back contact 75 of relay 1L, front contact 158 of relay 1SI, winding of this relay, through back contact 146 of relay 1SO to (—). This stick circuit is closed very quickly after the energizing circuit through front contact 61 of relay F1 opens the circuit then maintaining relay 1SI energized;

and this relay ISI is sufficiently slow releasing to hold over this interval. Thus, during the change from the conditioning period to the first "off" interval, the relay ISI at the station in question is maintained energized.

The release of the receiving relay F1 at the end of the conditioning period also releases the line repeater relay IFP to cause energization of the first step relay IV1; but this does not affect the energizing circuit just traced for the pulse relay IPL, which remains energized until relay F1 is energized during the next "on" interval.

Considering now the effect of this pulse of the frequency f3 in the control office, this pulse acts through the filter and amplifier to operate the message relay M to move its contact fingers 135 and 136 from the position shown to the right, and when the operation of the first step relay V1 releases the relay E, a circuit is established for energizing the transmit relay P1 over a circuit which may be traced from (+), through back contact 42 of relay E, back contact 43 of relay C, front contact 142 of relay FC, contact finger 135 of relay M to the right, connection 143 to the f1 bus and relay P1 to (—).

This energization of the transmit relay P1 picks up the repeater relay FP, and the relay E being de-energized at this time, a circuit is established for energizing the first station registration relay ISR, which may be traced from (+)B, contact finger 136 of relay M to the right, front contact 137 of relay CY, now closed, front contact 160 of relay FC, front contact 161 of the relay FP now energized, back contact 162 of relay E, wire 163, back contacts 164—167 of relays VL, V4, V3 and V2, and front contact 168 of relay V1, wire 169, through the lower winding of relay ISR to (—)B. The station selecting relay ISR is then stuck up through a stick circuit from (+) through front contact 27 of relay CY, wire 170, and front contact 171 of relay ISR through its upper winding to (—).

Thus, the first code element of the field station in question, constituting a pulse of field frequency f3, is registered in the control office by the energization of the station registration relay ISR during the first "on" interval following the conditioning period, as indicated in the sequence chart of Fig. 4F.

When the energizing or execution circuit for the station registration relay ISR is broken by opening of the back contact 162 of the impulsing relay E near the end of the "on" period under consideration, the message relay M is restored or reset to the normal position shown by energization of its lower winding over a circuit readily traced through the front contact 173 of relay E and front contact 174 of relay FP. In this way, the message relay M is automatically reset or restored during each "on" interval, after its operated or non-operated condition has been utilized to govern station registration relays, and also indication devices during the latter part of the cycle, in a manner that will be readily apparent without further explanation.

Referring to the field station of Figs. 2A and 2B, the impulse frequency f1 thus transmitted from the control office energizes the receiving relay F1 and establishes a circuit for maintaining the relay ISI energized, while its stick circuit previously mentioned through the back contact 74 of relay F1 is broken, this sustaining circuit being traced from (+), through front contact 123 of relay ISI in Fig. 2A, through back contact 60 of relay F2, front contact 61 of relay F1, code receiving bus f1, back contacts 92—95 of step relays IV2—IVL, front contact 96 of stepping relay IV1, now energized, through the code jumper connection 97 to the stick bus 98, front contact 158 of relay ISI, winding of this relay, and back contact 146 of relay ISO to (—).

The energization of receiving relay F1 also opens the circuit previously mentioned for the pulsing relay IP1, restoring it and its repeater relay IPLP to normal, ready for energization or not, as may be required for the next step.

In accordance with the particular code selected for the typical field station shown in Figs. 2A and 2B, there is no code jumper in the connection 175 to the front contact 176 of the first relay IV1; and consequently, the release of relay IVP does not prepare any energizing circuit for the pulsing relay IPL, and there is no pulse of the field frequency f3 transmitted to the control office during the next or second "off" period. Consequently, the upper winding of relay M in the control office (Fig. 1A) is not energized, and its contact fingers remain in the normal position shown. Thus, when the relay E releases to provide the next "on" period, the contact finger 135 of relay M is in the position to cause energization of the transmit relay P2 over a circuit similar to that previously traced for energization of the transmit relay P1, but including connection 177 to the f2 bus. In other words, when there is a non-pulsed condition of the line circuit during an "off" interval, the control office responds with the frequency f2.

Such impulse of the frequency f2 for the second station selecting step causes energization of the receiving relay F2 to provide a sustaining circuit for the relay ISI similar to that previously traced, including the code jumper 178 and front contact 67 of the step relay IV2.

In the control office, this non-pulsed condition of the line circuit for the second station selecting step is registered in effect by failure to energize the station selecting relay 2SR, because in this instance the contact finger 136 of the relay M is in the left-hand position shown at the time front contact 161 of relay FP closes, and no current flows through the lower winding of the relay 2SR because both of its terminals are connected to (—)B.

After the station selecting and registration steps, which are two steps in the particular arrangement shown, the system is preferably organized to send a pulse of the frequency f3 during the next or 3rd "off" period from the surviving field station, in the nature of an answer-back or check indication to show that a field station has actually been selected and that subsequent pulsed or non-pulsed condition of the line circuit represent indications from such surviving station to be used for operation of indication devices in the control office. This check pulse received from a selected station during an indication cycle completes the final station registration operation by energizing the station relay such as 1ST, dependent upon the existing condition of the station registration relays 1SR and 2SR.

Referring to the field station equipment in Fig. 2B, there is a permanent connection 159 to the pulsing bus 133 energizing the relay IPL to the front contact 155 of the step relay IV2, so that a circuit for energizing the relay IPL, similar to that previously traced through the code jumper 156, is established when the receiving relay F1 or F2 releases for this 3rd "off" interval, provided the associated station selecting relay such as ISI is energized and its front contact 150 in such circuit is closed.

Thus, if the relay 1SI at the station supposed to be transmitting indications in the example under consideration, should for any reason fail to remain energized, the answer-back or check pulse is not transmitted to the control office; and the same would be true if there was no relay such as 1SI energized at some station during an indication cycle occurring when a number of field stations are trying to send in its indications to the control office.

Referring to the control office equipment in Figs. 1A and 1B, reception of such a check pulse operates the message relay M to set its contact finger 136 to the right-hand position; and when the line repeater relay FP picks up during the next "on" interval, a circuit is established for energization of the station relay 1ST belonging to the station under consideration by a circuit which may be traced from (+)B, contact finger 136 of relay M to the right, front contact 137 of relay CY, front contact 160 of relay FC, front contact 161 of relay FP, back contact 162 of relay E, wire 163, back contacts 164 and 165 of step relays VL and V4, front contact 166 of step relay V3, wire 179, front contact 180 of relay 1SR now energized, back contact 181 of relay 2SR, and lower winding of station relay 1ST to (−)B.

The station relay 1ST thus energized by the check pulse is maintained energized until the end of the cycle by a stick circuit through its upper winding, front contact 182, wire 170 and front contact 27 of relay CY.

At the same time, the energization of the step relay 1V3 in the field station in Fig. 2B closes a front contact 101 to connected (+) directly to the stick bus 98 and maintain the relay 1SI at the station under consideration energized throughout the rest of the cycle.

Although only two station registration steps have been illustrated, it is evident that the same mode of operation may be carried out for as many steps as required for the number of stations.

From the foregoing explanation, it can be seen that the registration in the control office of the code elements of the station calling is accomplished by the control of station registration relays 1SR, 2SR, during each "on" interval, as a result of the pulsed or non-pulsed condition of the line circuit with the field frequency f3 existing during the next preceding "off" interval. Also, the control office responds to the reception of a code element from a field station, in the form of a pulse or non-pulse of frequency f3, by transmission of a corresponding code element of frequency f1 or f2. In short, the control office replies in effect, during each "on" interval of the station registration steps, to what it receives from the field station.

One attribute of this organization is that the same circuit connections and code jumpers may be employed for governing both of the relays such as 1SO and 1SI during a control cycle and an indication cycle, thereby obviously simplifying the apparatus and circuit required.

Another important characteristic of this automatic repeat or response by the control office of code elements corresponding to those received from a field station is that such transmission from the control office reaches all field stations, and can be conveniently employed, as presently explained, to exercise the desired preference or priority as between a plurality of field stations ready to send in indications at the same time.

*Transmission of a typical indication.*—Assuming the typical station shown in Figs. 2A and 2B is the one that is sending in indications and has been registered in the control office by energization of the station relay 1ST, indications may be received from this field station and used to actuate the particular indicating devices belonging to this station; and a description of the operation in transmitting one typical indication will serve to make clear how the same expedient may be employed for transmission of any desired number of indications.

Indications are transmitted by energizing, or not energizing the pulsing relay 1PL. Considering the indication transmitted during the first step after the station registration portion of the indication cycle, and referring to the sequence diagram of Fig. 4G, during the "on" interval prior to the energization of the step relay V4, the half-step relay 1VP at the field station in question in Fig. 2B is deenergized and prepares a circuit through back contact 183 of step relays 1VL and front contact 184 of stepping relay 1V2, to control the energization of the pulsing relay 1PL in accordance with the position of the contact 185 of the track relay 1TR.

Assuming this track relay 1TR to be energized and its front contact 185 closed as shown, when both of the receiving relays F1 and F2 release to close their back contacts 73 and 74, the relay 1PL is energized by a circuit similar to those previously traced for operation of this relay, and a short pulse of the frequency f3 is applied to the line circuit to operate the relay M in the control office and position its contact finger 136 to the right.

Then, when the relay FP in the control office picks up during the next "on" interval, a circuit is established for governing the energization of the mag-stick indication relay 1TK, corresponding to the particular track relay 1TR under consideration, this circuit being traced from (+)B, through contact finger 136 of relay M to the right, front contact 137 of relay CY, front contact 160 of relay FC, front contact 161 of relay FP, back contact 162 of relay E, wire 163, back contact 164 of relays VL, front contact 165 of relay V4, wire 186, front contact 187 of the station relay 1ST, winding of relay 1TK, to a terminal designated C and corresponding with the mid-tap of the split battery shown in Fig. 1A. This indication storing relay 1TK is assumed to be of the type, such as disclosed in the prior patent to Hailes, et al., No. 1,929,094, granted October 3, 1933, which causes its contact fingers to assume one position, and remain in that position until changed, dependent upon the polarity of the current momentarily flowing in its winding. Such an indication device acts to store an indicating condition of the track relay 1TR momentarily transmitted from a field station, and its contacts may be employed to light an indicating lamp as shown, or otherwise produce the desired information for the operator.

An indication may be transmitted during the last "off" interval, as shown; but in this case the execution circuit during the clear-out period is established through a front contact 188 of relay CO, in multiple with front contact 161 of relay FP, until relay FC releases, relay FC being made sufficiently slow-releasing to give the desired execution time.

During the transmission of indications in this way for the two indication steps shown, the line circuit is energized with the frequency f1 or f2, as the case may be, dependent upon the character of such indications, for the purpose of continuing the stepping operation; but the particular frequency $f1$ or $f2$ transmitted during these indication steps does not perform any station selecting or registration function.

*Clear-out for an indication cycle.*—At the end of an indication cycle, both frequencies $f1$ and $f2$ are applied in the control office to perform the clear-out function, in the same way as for a control cycle previously discussed, and the resultant operation in the control office and at the field station is similar, except as indicated in the sequence chart of Fig. 44, relays FC, the station relay 1ST, and the station registration relays 1SR, 2SR, are released when the respective energizing circuits hereinbefore described are broken. The relay FC releases due to the opening of its stick circuit at the back contact 139 of the relay CO; the station relay 1ST drops when front contact 179 of relay FC opens; and the station registration relay 1SR and 2SR release when their stick circuits are broken by opening of the front contact 27 of the relay CY.

In the arrangement shown involving transmission of an indication during the last "off" interval of an operating cycle, this indication has to be executed and the message relay M restored during the clear-out period, and this involves certain operations conveniently considered at this time.

Figure 4H:
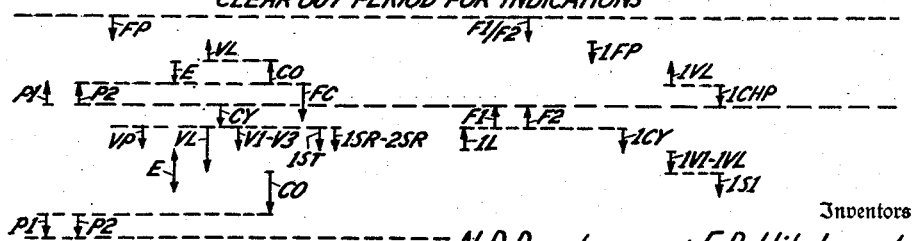

Referring to the sequence of relay operation indicated in Fig. 4H, and starting at the time when the last step relay VL is energized, the relay E is released by energization of relay VL at the same time the clear-out relay CO is energized, and the execution circuit for the indication mag-stick (not shown) through the front contact 164 of the step relay VL is closed through a front contact 188 of the relay CO. The energization of the relay CO and opening of its back contact 139 releases the field cycle relay FC to open at its front contact 180 this execution circuit, and the relay FC is preferably made slightly slow releasing as indicated to afford sufficient time for effective energization of the mag-stick indication relay in question. The release of the cycle marking relay CY deenergizes the stick circuit for the stepping relays V1—VL, but the last step relay VL is slow releasing and the relay E is temporarily energized to close its front contact 173 in Fig. 1A and establish a circuit through a front contact 194 of the clear-out relay CO through the lower winding of the message relay M to restore it to its initial condition shown, such special restoring circuit for the relay M being required in this instance, since the relay FP is not energized during the clear-out period.

The clear-out at a field station for an indication cycle involves the release of the relay such as 1SI when the stepping relay 1V3 drops and opens its front contact 101. Also, when the particular station under consideration has completed its cycle of transmitting indications, the change repeater relay 1CHP is released when the last stepping relay 1VL picks up to open its back contact 125, while the back contact 123 of relay 1SI is open.

*Station selection for indications.*—Considering now the situation where at the beginning of an indication cycle two or more stations are ready to send indications to the control office, each having a change repeater relay such as 1CHP energized, all of these stations are conditioned to send code elements to the control office by the energization of a station selecting relay such as 1SI; and it can be readily appreciated that the effect of such plurality of field stations attempting to send indications at the same time would create a hopeless jumble of code elements in the control office, so that some expediency must be employed in a system of this type to select or weed-out from such field stations a particular one of these field stations to be registered in the control office, and to transmit to the control office indications from that station alone, during one given operating cycle.

As previously indicated, the operation of station selection or rejection is accomplished in this system on the basis of the relative code superiority of the code calls allotted to the stations; and this operation has been generally explained. It has also been explained in detail how any given field station is effective, so long as its station selecting relay such as 1SI is energized, to create a pulse or non-pulse condition of the line circuit during the "off" intervals, dependent upon the code jumpers representing its code call, and also how such pulse or non-pulse condition is repeated or reflected in effect from the control office by sending out a frequency $f1$ or $f2$. Further, it has been explained in connection with the transmission of indications from one station alone how the reception of such pulse and non-pulse code elements in the control office acts to control the station registration relays to conform with the code call received; and finally how the reception of the frequency $f1$ or $f2$ at a field station acts to maintain its station selecting relay such as 1SI energized, provided such frequencies match the code call allotted to that station.

These features of the system co-operate to select as between a plurality of field stations, ready to send in indications at the same time, on the basis of the relative code superiority of their code calls, together with the registration in the control office of the surviving station. In this connection, it has been assumed for the organization shown that a pulse of field frequency $f3$ constitutes a code element superior to the non-pulse condition, and that the frequency $f1$ repeated from the control office in response to the reception of a field frequency pulse similarly represents the superior code element; but other priority allocations may be used.

The operation of the system in this matter of field station priority may be illustrated by considering that two field stations are active to send in indications at the beginning of the same indication cycle, the first station corresponding with the typical field station shown calling for a pulse of field frequency $f3$ during the first "off" interval, while the second station calls for a non-pulsed condition for the first code element in its code call. Assuming such a situation, and referring to the first off interval following the conditioning period, the first station in question transmits a pulse of field frequency $f3$ which operates the relay M in the control office to call for a repeat during the next "on" period, of the frequency $f1$, and also energizes the station selecting relay 1SR. During the next "on" interval, the reception of this frequency $f1$ acts at the first station in question to keep its relay 1SI energized; but at the second station, no circuit is established for its relay corresponding with 1SI when its receiving relay F1 is energized, due to its arrangement of code jumpers. Consequently, when the relay F1 at this second station opens its back contact 74 then holding up its relay such as 1SI, this relay releases, because there is no other control stick circuit through the code jumpers to maintain it. Such release of the relay such as 1SI at the second station opens its front contact 123, so that this relay cannot again be energized by any subsequent impulse of a frequency f2 corresponding with its code jumpers. Incidentally, the opening of the front contact 189 of this same relay such as 1SI stops further operation of the stepping bank at this station.

From this explanation, it can be seen how a station is dropped out or rejected on the first step when its code call requires an interior code element, and some other station has a corresponding superior code element, and causes a repeat from the control office of the superior frequency f1. This same operation of holding in or rejecting a field station for the first code element of the different code calls allotted to the various field stations, is carried out for each of the subsequent steps in the station registration portion of the cycle, two steps as shown. If it should happen that two stations have a superior code element for the first step, then both of these stations will be retained, but one or the other will be rejected on some subsequent step, so that at the end of these steps, only one station is left.

When a field station survives and sends in indications to the control office, the opening of the back contact of the last step relay such as 1VL at such station, while its relay such as 1SI holds its back contact 123 open, releases the relay such as 1CHP at that station; but when a field station is dropped out, its relay such as 1CHP remain energized to create a field start at the next opportunity and cause energization of its relay such as 1SI at the beginning of the next indication cycle and transmit indications, unless there is still some other station with a superior code call ready to send new indications. This operation continues until all field stations have transmitted their new indications in due time.

At this point it is convenient to explain the need for using a check pulse from a field station to complete the final station registration, as previously described, where transmission of carrier frequency pulses are involved. As previously noted, in a carrier frequency type of system, there is the contingency that pulses transmitted from different field stations at different locations during the station selecting portion of an indication cycle may be identically the same frequency, and have such phase relation as to neutralize each other at the control office and fail to operate the message relay M. In such a case, the control office responds with an inferior code element of the frequency f2, and for reasons just explained, these stations having a code call calling for a line pulse condition, are automatically dropped out by deenergization by release of their station selecting relays such as 1SI. If these stations should happen to be the only ones effective at the time to transmit indications, the indication cycle will be continued by the control office apparatus as an idle cycle, and with no pulsed conditions of the line circuit. In order that the non-pulsed condition of the line circuit during such an idle indication cycle may not cause any improper operation of indication devices in the control office, it is desirable that no station relay such as 1ST should be energized under such conditions; and this is accomplished, as previously explained by reason of the fact that a check pulse is required to energize the station relay such as 1ST. In other words, if there is no field station with its station selecting relay such as 1SI energized after the station selecting steps of an indication cycle, whether due to the effect of phase cancellation as between pulses transmitted from different field stations, or other causes, there is no registration of a station in the control office, and no control of indication devices during the remainder of this idle indication cycle carried out by the control office apparatus.

*Storing field starts.*—In a centralized traffic control system, for which the communication system of this invention is particularly adapted, a train may enter or leave a track section at any time, even during an indication cycle of transmitting indications from the associated field station; and it is desirable to store such changes to create field starts in such a way that every new indication will be transmitted.

For this reason, the change relay 1CH in Fig. 2B is restored to its normal condition upon energization of its repeater relay 1CHP as previously explained, and this change relay 1CH is rendered responsive to a change in any indication control device, such as the track relay 1TR, which may occur while the same field station is transmitting indications at the beginning of such transmission, by operation of the back contact 128 of the step relay 1V3.

Thus, if the track relay 1TR, for example, should be operated during some of the later steps in the indication cycle following energization of the step relay 1V3, and after the condition of this track relay 1TR has been indicated in the control office, then the change relay 1CH is automatically deenergized to store another field start. At the end of such indication cycle, when the last step relay 1VL picks up and opens its back contact 125 to release the repeater relay 1CHP, this relay opens its front contact 127 before the step relay 1V3 releases to close its back contact 128; and hence the change relay 1CH remains deenergized to pick up the repeater relay 1CHP a second time when the relays 1SI and 1VL are restored at the end of the cycle, thereby insuring another indication cycle from this field station for the purpose of transmitting an indication of the new changed condition of the track relay 1TR different from that last reported to the control office.

*Disconnecting field stations.*—It is sometimes necessary to disconnect a field station equipment from the line circuit for inspection, test or repair of relays or other parts; and for this purpose a suitable manually operable disconnect switch DS, shown conventionally, is usually provided to disconnect by its contacts 191 the line circuit from the field station equipment, and by its contact 192 the local battery from all the energizing circuits for the various relays. When a field station has thus been disconnected by operation of the disconnect switch DS, it is desirable to provide suitable means so that, if this switch is subsequently operated to reconnect the equipment to the line circuit while an operating cycle is in progress, the field station will not be improperly operated to interfere with code transmission then in effect.

In this connection, it can be seen that, when energy is cut off from the field station, the change relay 1CH is released, and unless special provisions were made, when the energy is again applied, its repeater relay 1CHP would pick up, and the pulsing relay 1PL could be energized during the next "off" interval of the operating cycle in progress to create a code element for a field start, which might well interfere with the code transmission from some other station. Also, without such special provision, the relays 1FP and 1CY, together with the station selecting relays ISO or ISI, might be energized during an "on" period of the operating cycle in progress, and initiate improperly the stepping operation at the field station in question.

For these reasons, a lockout relay IL is provided in the system of this invention to prevent such premature or false operation of a field station equipment, when it is operatively connected to the line circuit during an operating cycle. As previously noted, this lockout relay IL, after being released at the beginning of each operating cycle, is not restored until both front contacts 73 and 74 of the relay F1 and F2 are closed by the application of both frequency f1 and f2 to the line circuit during a clear-out period.

When the energy disconnected from the field station by operation of the disconnect switch DS, the lockout relay IL is, of course, released; and it can be seen that after energy is again applied to the field station, this lockout relay IL will not be energized until a clear-out period occurs, either at the end of an operating cycle then in progress, or at the end of some subsequent cycle. Consequently, if the field station should be reconnected to the line circuit while an operating cycle is in progress, the receiving relays F1 and F2 and the line repeater relay IFP will start to operate; but the open front contact 79 of the relay IL prevents energization of the relay ICY, the open front contact 63 of relay IL prevents energization of the relay ISI or ISO and then open front contact 130 of the relay IL prevents energization of the pulsing relay IPL with the relay ICHP energized, so that no improper operation of the system may occur.

MODIFIED SYSTEM ORGANIZATIONS

The specific embodiment of the invention, shown in Figs. 1A to 2B and hereinbefore described, involves the transmission of distinctive carrier frequencies f1, f2 and f3 over the line circuit, on the assumption that other facilities on the line circuit may restrict the choice of the carrier frequency to be used for communication purposes; but where there is no particular limitation upon carrier frequency available for the communication system of this invention, a single carrier frequency modulated with two or more control tones may be employed instead of three different carrier frequencies. This involves merely changing the transmitting and receiving equipments at the control office and the field stations as shown in Fig. 5.

Referring to the modified form of control office equipment shown in Fig. 5, an oscillator OSC—f generating one carrier frequency is rendered active when either one or both of the transmitter relays P1 or P2 is energized to close their front contacts 195, 196. This carrier frequency is preferably one in the order of 10,000 cycles per second or higher, which is suitable for effective modulation with appropriate tone frequencies which may be segregated by ordinary filter facilities, such as 100 and 200 cycles per second, it being evident that there is a large variety of carrier frequencies and tone frequencies suitable for this purpose.

This oscillator OSC—f for the single carrier frequency involved in this modification is provided with suitable modulating means of any one of the well-known types, which is indicated schematically in block form and designated "modulator." Suitable tone generators, shown schematically in block form and designated 1TG and 2TG, preferably in the form of a power oscillator, are arranged to be connected to the input of the modulator upon energization of the transmit relay P1 and P2 to close their front contacts 197 and 198, as can be readily seen from the circuit connections illustrated.

Thus, the energization of either or both of the transmitter relays P1 and P2 causes transmission of the carrier frequency modulated with a corresponding one or both of the two control tones generated by the tone generators 1TG and 2TG.

In the typical field station for the modified organization shown in Fig. 5, the amplifier is coupled to the line circuit by a coupling transformer, and also by a filter if necessary to discriminate against other facilities on the line circuit, in the same way as shown for the two amplifiers and filters in Fig. 2A, by operation of back contacts 14 and 15 of the pulsing relay IPL and its repeater relay IPLP.

This amplifier is provided with suitable demodulating means of any one of the well-known forms, shown schematically in block form and designated "demodulator"; and the output of this demodulator is connected through band-pass filters designed for the frequencies of the control tones 1T and 2T, the receiving relays F1 and F2 being connected to the output of these filters so as to be energized in response to the transmission of the corresponding control tone along with the carrier frequency.

The field station equipment also includes an oscillator OSF—f which is controlled by front contacts 7 and 8 of the relays IPL and PLP in the same way as the oscillator OSC—f3 in Fig. 2A. Since the amplifier governing the operation of the message relay M in the control office is automatically disconnected by opening of the back contacts 10 and 11 of the transmit relays P1 and P2 whenever a carrier frequency impulse with a modulating control tone is applied to the line circuit at the control office, it can be seen that the same carrier frequency applied in the control office may also be used for the frequency pulses transmitted from the field stations.

In this modified organization of Fig. 5, the cross-fire between transmitting and receiving means at the same or different stations previously discussed will not cause improper operation of the receiving relays F1 and F2, because these relays require a predetermined tone modulation of the carrier frequency, while the frequency pulses sent from the same or a different field station is the carrier frequency without any modulation. Accordingly, the contacts 14 and 15 of the relays IPI and IPLP are not required in order to disconnect the receiving means at a field station to avoid improper operation of the receiving relays F1 or F2; but it is considered desirable to use such contacts as shown, as to avoid overloading or other objectionable effect upon the filter and amplifier at a station, designed to respond to low level energy, by the application of high level energy to the line circuit at the same point.

The operation of the receiving relays F1 or F2, or both, in response to the tone modulation of the carrier frequency transmitted from the control office by the operation of the transmit relay P1 or P2, or both, and also the operation of the message relay M in the control office in response to pulses of the same carrier frequency from one or more field stations, causes operation of the equipments at the control office and the field stations for the desired transmission of controls and indications in exactly the same way as previously described for different carrier frequencies $f1$, $f2$ and $f3$.

Fig. 6 illustrates a further modified organization of the invention, in which modulation of a single carrier frequency by control tones in the same manner shown in Fig. 5 may be employed for communication between the control office and a plurality of field stations by radio or space radiation. In connection with this modification of Fig. 6, it is assumed that oscillators, amplifiers, modulators and demodulators of the usual type and construction will be employed in connection with radio or space radiation at some suitable frequency allocated for some communication purposes.

This modification of Fig. 6 involves the same general organization shown in Fig. 5 and previously explained, with detail changes in the circuits to provide for connecting a conventional antenna, or equivalent radiating element, to the radio transmitting and receiving apparatus separately at different times by the operation of the transmit relays P1 and P2 at the control office, and the pulse relay 1PL and its repeater relay 1PLP at each field station.

Referring to the particular arrangement shown in Fig. 6, it can be readily seen that the oscillator OSC—$f$ in the control office is connected to the antenna 199 through front contacts 195 and 196 of the transmit relays P1 and P2 when either or both of these relays is energized; while the amplifier and message relay M is normally connected to the antenna through the back contacts 200 and 201 of these transmit relays P1 and P2 under normal conditions and during the "off" intervals in transmission of controls and indications. When the transmitter relay P1 is energized, the antenna 199 is connected to the oscillator OSC—$f$ through a back contact 201 of relay P2 and a front contact 200 of relay P1, while the tone generator 1TG is rendered effective by closure of the front contact 197 of relay P1. Similarly, when the other transmit relay P2 is energized, the antenna 199 is connected to the oscillator OSC—$f$ through the front contact 201 of this relay, while the other tone generator 2TG is rendered effective by closure of the front contact 198 of this relay P2. If both of the transmitter relays P1 and P2 are energized at the same time for the clear-out control, the antenna is connected to the oscillator through the front contact 201 of relay P2, and both tone generators 1TG and 2TG are rendered effective by closure of the front contacts 197 and 198 of a relay P1 and P2.

Similarly, the antenna 203 at the field station is momentarily connected to the oscillator OSC—$f$ through the front contacts 204 and 205 of the relays 1PL and 1PLP, and is normally connected to an amplifier through the back contact 204 of relay 1PL and also through the front contact 204 of this relay 1PLP and a back contact 205 of relay 1PL after termination of the frequency pulse and while the pulse relay 1PL is energized.

In view of the foregoing explanation, the operation of the modified organization for radio or space radiation illustrated in Fig. 6 may be understood without further explanation.

*Summary.*—From the foregoing, it can be seen that this invention provides a communication system which operates by transmission of carrier frequency pulses, either over a line circuit or by radio or space radiation, and which has the desirable attributes required of a communication system suitable for transmission of controls and indications between a control office and a plurality of field stations for centralized traffic control systems, with the necessary station selection and station priority required in systems of this character. Further, by the use of a distinctive controlling condition for clear-out purposes, the conditioning clear-out period characteristic of a code communication system having prescribed operating cycles is made materially short, as compared with the present practice of employing slow-release relays to define the conditioning and clear-out periods.

Since the code elements used in this system are given distinctive character by virtue of the line circuit energization, independently of the duration or spacing of such energizations, a faster stepping operation and a shorter operating cycle results as compared with systems employing a time code, in which the code elements are distinguished by the length or duration of the energized or deenergized condition of the line circuit.

The communication system of this invention may be employed in connection with any type or arrangement of control and indication devices, and may be supplemented by cycle distribution means or field station suppression, repeater stations, and other adjuncts sometimes used with communication systems for centralized traffic control.

In the present type of system, since the line circuit is not opened for communication purposes, a break in the line circuit does not interfere with operation of the communication system from the control office up to the point of the break, and no automatic sectionalizing means is required, as disclosed for example in the prior patent to Hailes, No. 2,223,103, November 26, 1940.

In short, the system of this invention may be adapted to any of the ordinary operating conditions for a centralized traffic control system, without material change and by merely adding to the system the same facilities and means heretofore proposed for systems of this type.

While the invention has been illustrated more particularly with regard to its application to centralized traffic control, the same features and functions may be employed individually and in various combinations for communication purposes in general and for other applications and uses.

The particular embodiment of the invention shown and described merely represents certain specific organizations of parts and circuits for accomplishing the desired functions and results; and we desire to have it understood that various modifications, adaptations, and additions may be made to these specific embodiments without departing from the invention.

What we claim is:

1. A code type communication system for establishing communication between a control office and a plurality of field stations one at a time in a predetermined order for the purpose of enabling such field stations to communicate indications to the control office on different operating cycles, said system comprising, transmitting means associated with each field station and including stepping means operated in response to time spaced impulses received from the control office for communicating to the control office only during the intervals between the impulses from the control office a controlling influence in accordance with the code elements of the code call belonging to that station, transmitting means in the control office including stepping means and means responsive to said controlling influences received from a field station or field stations then operating for transmitting to all field stations the next succeeding impulse of a code character dependent upon what controlling influence is received from such field station or stations during the last interval between impulses, said transmitting means at the control office acting to transmit a code impulse of one superior character in preference to another if the reception from any field station then acting calls for such superior character, and station selecting means at each field station conditioned at the beginning of each operating cycle if that station has new indications to communicate to the control office, and maintained effective only if the character of all of the impulses received from the control office match the code call belonging to that station, whereby a plurality of field stations having new indications to communicate to the control office are automatically selected one at a time during different operating cycles in accordance with the relative code superiority of their code calls.

2. A code communication system operating by carrier frequency transmission for providing indications from a plurality of field stations one at a time in a predetermined order during successive operating cycles to a distant control office comprising, transmitting means at the control office including self-propelled stepping means operable to transmit to all field stations impulses of carrier frequency of different selected characters at successive intervals, transmitting means associated with each field station and including stepping means automatically operated in response to the transmission of said impulses from the control office regardless of their selected characters for selectively transmitting or not a pulse of carrier frequency during each of the off intervals between said impulses from the control office dependent upon the code call allotted to that station, control means at the control office governed by the respective pulses received from the field stations then acting for determining the character of the next succeeding frequency impulse to be transmitted from the control office, said control means acting to transmit an impulse of one character in preference to the other if such character should be called for by any one of the field stations, station registration means in the control office operated in accordance with the character of the successive impulses transmitted by the control office, and station selecting means at each field station initially conditioned at the beginning of each operating cycle, and maintained effective after the transmission of the series of impulses from the control office only if the character of such impulses matches the code call belonging to that field station.

3. In a code communication system for providing communication between a plurality of field stations one at a time during different operating cycles and a control office for transmission of indications to said control office, transmitting means in the control office including stepping means operable when set into operation to transmit to all field stations at successive intervals impulses of one or the other of two different carrier frequencies as determined by the character of a controlling influence received from a field station or stations during the next preceding off interval between such impulses, transmitting means and stepping means at each field station operable when that station has new indications to transmit for determining the transmission of a relatively short controlling influence to the control office only during said off intervals dependent upon the distinctive code call belonging to that station, means for registering in the control office the character of the respective impulses transmitted by the control office, and station selecting means at each field station controlled by the character of the successive impulses transmitted from the control office when that station has new indications to transmit and effective after the transmission of said impulses from the control office only if the character of these impulses matches the code elements of the code call belonging to that station, whereby if a plurality of field stations are ready to send indications to the control office at the same time, only one field station with the most superior code call is selected and becomes effective to transmit indications during that operating cycle.

4. In a code communication system operating by carrier frequency transmission for providing communication between a plurality of field stations one at a time and a distant control office, means in the control office including stepping means operable when set into operation by a field start from a field station to transmit to all field stations during certain station selecting steps a series of carrier frequency impulses of selected variable character during an operating cycle, step-by-step means at each field station operated by said series of impulses received from the control office provided that station has new indications to send to the control office, transmitting means at each field station governed by the associated step-by-step means for transmitting or not transmitting a pulse of carrier frequency distinctive from those transmitted by the control office during the off intervals between the impulses of said series in accordance with the code elements of the code call alloted to that station, receiving means in the control office responsive to a pulse received from any field station or stations then operating to transmit to all field stations the next impulse of the series of one character in preference to another character to constitute a superior station selecting and registration code element, station registration means in the control office goverened in accordance with the character of the frequency impulses transmitted by the control office, and station selecting means at each field station initially rendered effective at the beginning of an indication operating cycle if that station has new indications to transmit and maintained effective during the series of impulses transmitted from the control office only if the character of such impulses matches the code call allotted to that station, whereby during an indication operating cycle only one field station having the most superior code call is selected for transmission of indications to the control office during the rest of such operating cycle, and this particular station is designated by the station registration means in the control office.

5. In a code communication system of the type described for establishing communication between a plurality of field stations one at a time in a predetermined order during successive operating cycles with a distant control office, transmitting means and receiving means in the control office and at each field station, each of said transmitting means acting while in operation to render its associated receiving means ineffective, means in the control office including stepping means for operating the associated transmitting means at successive intervals separated by off intervals to send to all field stations a series of impulses each having its character determined by the response to the associated receiving means to the character of the code element received from the field stations during the next preceding off interval, said means at the control office acting to transmit impulses of one character in preference to a different character if the code elements for different field stations then acting call for such different characters, means at each station including stepping means governed by the associated receiving means for controlling the operation of the associated transmitting means for a relatively short time during successive off intervals in accordance with the code elements of the distinctive code call allotted to that field station, station registration means in the control office governed in accordance with the character of the impulses transmitted by the control office to the field stations, and station selecting means at each field station acting to select that station only if the character of all of the impulses received from the control office match the code call allotted to that station.

6. In a code communication system for providing communication between a plurality of field stations one at a time during successive operating cycles and a distant control office, equipment in the control office comprising, transmitting means acting when set into operation to send to all field stations at spaced intervals carrier frequency impulses of a selected one of a plurality of different characters, carrier frequency receiving means operable by pulses received from a field station or stations only during the off intervals between the impulses produced by said transmitting means, and means governed by said receiving means during each off interval for determining the character of the next carrier frequency impulse to be sent to all field stations by said transmitting means.

7. In a system of the code communication type operating by transmission of carrier frequency and providing communication between a plurality of field stations one at a time during successive operating cycles with a distant control office, a carrier frequency transmitter and a receiver at the control office and at each field station, means for rendering each receiver inactive while the associated transmitter is active, impulsing means at the control office including self-propelled stepping means for rendering the associated transmitter active at spaced time intervals and for modulating the resultant carrier frequency impulses with a selected one of a plurality of control tones, means governed by the receiver in the control office and responsive to pulses of the same carrier frequency as received from one or more field stations then acting to select the modulating tone for the next impulse to be transmitted from the control office, filters and receiving relays associated with the receiver at each field station and separately energized in response to the tone modulation of the carrier frequency impulses received from the control office, means at each field station including stepping relays governed by the associated receiving relays for rendering the associated transmitter effective during the off intervals between the impulses from the control office to send a relatively short impulse of the same carrier frequency to the control office dependent upon the code call allotted to that station, and station selecting means at each field station governed by the associated receiving relays and stepping relays for selecting that station only if the tone modulation of the series of carrier frequency impulses received from the control office match the code call for that station.

8. In a multiple impulse code communication system for providing communication between a control office and a plurality of field stations, code transmitting means at the control office for transmitting a series of time spaced energy impulses of selected distinctive frequencies, code transmitting means at each field station effective when initiated into operation to transmit or not a distinctive frequency energy impulse different from said control office distinctive frequencies during each time space of said series in accordance with the code of that field station, means at the control office responsive to the reception of such distinctive frequency impulse from a field station for determining the particular frequency of the next succeeding impulse of the series transmitted from the control office, and code receiving means at each field station responsive to each impulse of a series transmitted from the control office for selecting that field station when the frequencies of such impulses form a code call characteristic of that station, whereby any particular station can cause its own selection by determining the code transmitted from said control office.

9. In a code communication system operating by a carrier frequency transmission for establishing communication between a control office and a plurality of field stations one at a time, means at the control office for transmitting to all field stations carrier frequency impulses of variable character during a conditioning period at the beginning of each operating cycle to designate a control or an indication cycle, said means acting to transmit other impulses at subsequent intervals during a portion of the operating cycle of a character dependent upon the code call for the particular field station to be selected during that operating cycle, receiving means at each field station responsive to the character of said impulses transmitted from the control office, stepping means governed by said receiving means, circuit means governed by said stepping means and including code connections corresponding with the code call belonging to the corresponding field station, separate station selecting relays for control cycles and indication cycles, means for initially energizing one of said station selecting relays in accordance with the character of the impulse received during the conditioning period, the energization of the station selecting relay for indication cycles being also dependent upon the existence of new indications to be transmitted from the corresponding station, and means at each field station including said circuit means and code connections at that station for maintaining or releasing the associated station selecting relay then energized dependent upon the character of the successive station selecting impulses transmitted from the control office.

10. In a code communication system of the character described operating by carrier frequency transmission, means including a transmitting means and stepping means at a control office for transmitting spaced carrier frequency impulses of distinctive character, receiving means at a field station responsive to such impulses transmitted from the control office, stepping means at the field station governed by the energization and deenergization of said receiving means, a transmitter at the field station operable to send to the control office a carrier frequency pulse of a character different from that transmitted from said control office, and pulsing means at the field station governed by the associated stepping means and operating successively during the off intervals between the impulses received from the control office in accordance with the code elements to be transmitted from that field station to render its transmitter effective for a short pulse period and at the same time render the associated receiving means ineffective.

11. In a communication system of the carrier frequency type, the combination of means intermittently operating at a control office to transmit carrier frequency impulses of a variable character at spaced intervals separated by off intervals, receiving means at a distant field station responsive to such impulses, stepping means at the field station operated in response to the energization and deenergization of said receiving means, a transmitter at the field station for applying to the line circuit a carrier frequency pulse distinctive from the impulses transmitted from the control office, means including a pulsing relay and energizing circuits therefor governed by said stepping means for energizing said pulsing relay during the off intervals between said impulses from the control office in accordance with the successive code elements to be transmitted from said station, and circuit controlling means governed by said pulsing relay for momentarily rendering said transmitter at the field station effective to apply a short pulse independently of the duration of energization of said pulsing relay and at the same time rendering said receiving means ineffective for such pulse period.

12. In a code communication system for providing communication between a control office and a plurality of field stations, means in the control office including a transmitter and step-by-step means operating when set into operation for transmitting to all field stations a conditioning impulse of a predetermined electrical character if said step-by-step means is in the initial condition, and for thereafter transmitting a series of spaced impulses of variable electrical character to provide distinctive code elements, said means in the control office acting when said step-by-step means has completed its operation for transmitting to each field station a clear-out impulse of an electrical character different from said conditioning impulse and also said series of code element impulses, stepping means at each field station, and means at each field station including receiving means responsive to a conditioning impulse transmitted from the control office for conditioning its stepping means to operate in response to said series of impulses, said means at each field station also acting in response to said distinctive clear-out impulse to restore its stepping means to an initial condition, whereby the stepping means in the field stations are set into operation and restored in synchronism with the step-by-step means in the control office by the distinctive character of the different conditioning and clear-out impulses independently of their duration.

13. In a code communication system of the carrier frequency type, a bank of stepping relays at a control office and at each of a plurality of field stations, transmitting means in the control office governed by the associated stepping relays for transmitting at spaced time intervals carrier frequency impulses of one character or the other to form distinctive code elements, receiving means at each field station distinctively responding to the character of said impulses transmitted from the control office for operating the associated stepping relays in step with those in the control office in response to the reception of said impulses from the control office regardless of their character, means in the control office acting automatically when the associated stepping relays have completed their operation to restore these relays to an initial condition and also to transmit carrier frequency impulses of both characters at the same time for a distinctive clear-out control, and means at each field station responsive to the operation of its receiving means by said clear-out control to restore the associated bank of stepping relays to the initial condition.

14. In a code communication system involving the transmission of distinctive code elements and synchronous operation of stepping relays in a control office and at one or more field stations during a given operating cycle, means in the control office including stepping relays operated sequentially for transmitting at time spaced intervals code elements of one character or the other to the field stations, said means in the control office acting automatically upon completion of the operation of said stepping relays to restore said relays to an initial condition and also to transmit code elements of both characters simultaneously for a clear-out control, stepping relays at each field station, receiving means at each field station for operating said stepping relays sequentially in response to the reception of code elements of either character from the control office, and cycle marking means at each field station initially energized in response to the reception of a code element of either character and maintained energized until code elements of different character are simultaneously received, said cycle marking means acting when energized to condition the associated stepping relays for operation by said receiving means and when deenergized to restore said stepping relays to an initial condition.

15. In a code communication system of the carrier frequency type, the combination with transmitting means in a control office operable during an operating cycle to transmit a series of carrier frequency impulses of variable character terminated by a clear-out control of carrier frequency impulses of different characters transmitted at the same time, field station apparatus comprising, receiving relays respectively energized in response to the reception of a carrier frequency impulse of a corresponding character, a repeater relay energized by the energization of any one of said receiving relays alone but not upon the simultaneous energization of said receiving relays, a cycle marking stick relay, a pick-up circuit for said cycle marking relay closed by the energization of said repeater relay, a stick circuit for said cycle marking relay opened only if said receiving relays are simultaneously energized, and stepping means operable while said cycle marking relay is energized by the intermittent operation of said repeater relay and automatically restored to an initial condition when said cycle marking relay is deenergized.

16. In a code communication system of the carrier frequency type, means at a control office including self-propelled stepping relays for transmitting a series of carrier frequency impulses of one or the other distinctive character, receiving means at a field station including receiving relays separately energized by said carrier frequency impulses of different character transmitted from the control office, cycle marking means at the field station initially energized in response to the energization of either of said receiving relays and maintained energized until both of said receiving relays are energized at the same time, stepping relays at said field station, said cycle marking means when energized rendering the associated stepping means operable in response to the successive energization and deenergization of either of said receiving relays, said cycle marking means acting when deenergized to restore the associated stepping relays to a normal initial condition, and means in the control office for transmitting carrier frequency impulses of both characters at the same time and for also restoring to a normal initial condition the stepping relays in the control office.

17. In a code communication system operating by transmission of carrier frequency impulses of variable character, field station equipment comprising, receiving means for energizing either or both of two receiving relays in response to the different character of carrier frequency impulses received, a repeater relay operated by the energization of either of said receiving relays, stepping relays operable by the intermittent energization of said repeater relay, and cycle marking means energized in response to the energization of either receiving relay and maintained energized until both of said receiving relays are energized at the same time, said cycle marking means acting when energized to cause operation of said stepping relays in response to the operation of said repeater relay and acting when deenergized to restore said stepping relays to an initial condition.

18. In a multiple impulse code type communication system for providing communication between a control office and a selected field station, code transmitting means at the control office for transmitting a series of energy impulses, certain energy impulses of said series being of a particular carrier frequency distinctively modulated with a control tone in accordance with the code call for said field station controls to be transmitted, the last energy impulse of said series including two distinctive tone modulations at the same time, receiving means at the field station including a cycle marking relay and step-by-step means, means for initially energizing said cycle marking relay in response to an energy impulse at the beginning of a series of impulses irrespective of its modulated character, circuit means for causing the step-by-step operation of said step-by-step means in response to the successive energy impulses of a series irrespective of their distinctive modulations only provided said cycle marking relay is energized, station selecting and control responsive means at the field station controlled on the successive steps in accordance with the distinctive modulation of the energy impulse for that step, and circuit means for maintaining said cycle marking relay effectively energized throughout the series of impulses until the last impulse of said two distinctive modulations at the same time occurs and effects the denergization of said cycle marking relay.

19. In a code communication system operating by transmission of carrier frequencies, means in a control office for transmitting during an operating cycle a plurality of time spaced impulses of one or the other of two different carrier frequencies followed by a clear-out control consisting of said two different frequencies transmitted at the same time, apparatus at a field station including stepping relays and receiving means for operating said stepping relays sequentially in response to the reception of either of said carrier frequencies, and cycle marking means at the field station governed by said receiving means, said cycle marking means being operated by the reception of either frequency to condition said stepping relays for operation by said receiving means, said cycle marking means being restored by the reception of both frequencies at the same time to restore said stepping relays to an initial condition.

20. In a code communication system transmitting a series of distinctive code elements during an operating cycle, apparatus in a control office normally operating during an operating cycle to provide a series of time spaced code elements of selected variable character terminating with a clear-out control of distinctive electrical character, apparatus at each of a plurality of field stations including stepping means operated in synchronism for transmission of said spaced code elements irrespective of their character and restored to an initial condition by the reception of said clear-out control, and means in the control office for automatically giving said clear-out control during an operating cycle whenever said apparatus in the control office fails to apply or terminate a code element for a time longer than the normal duration and spacing of said code elements.

21. In a code communication system operating by the transmission during an operating cycle of a series of spaced code elements of limited duration, transmitter relays in the control office for creating said code elements, means including stepping relays and an impulsing relay for intermittently operating said transmitter relays selectively during an operating cycle, a repeater relay controlling said stepping relays and responsive to the operation of said transmitter relays, means operating upon completion of the operation of said stepping relays for providing a distinctive clear-out control of code elements of different characters transmitted at the same time, and means effective during an operating cycle and including two slow-acting relays energized respectively by said repeater relay and said impulsing relay for automatically giving said clear-out control whenever during an operating cycle there is no application nor termination of a code element for a time longer than the normal duration of spacing of said code elements.

22. In a code communication system for establishing communication between a plurality of field stations one at a time and a distant control office, transmitting and receiving means in the control office and at each field station having new indications to transmit for cooperating during an operating cycle to select a particular field station for transmission of indications in accordance with the character of a series of carrier frequency impulses transmitted from the control office in response to pulses of carrier frequency received from the field stations, means in the control office including a station relay for each field station and selectively governed in accordance with the character of the series of carrier frequency impulses transmitted from the field station for registering in the control office a particular field station selected for transmission of indications, and means at each field station operative only when that field station has been selected for transmitting a check pulse to the control office for energizing the corresponding station relay of said station registering means.

23. In a code communication system operating by transmission of a series of carrier frequency impulses during an operating cycle for providing communication between a selected one of a plurality of field stations having new indications to transmit and a distant control office in accordance with the relatively code superiority of the code calls belonging to these stations, transmitting and receiving means in the control office and at each field station operable to transmit alternately during successive on and off intervals carrier frequency impulses of variable character, said transmitting means in the control office acting to vary the character of the series of impulses dependent upon the transmission of a controlling influence from a field station during the next preceding off interval, a group of station registration relays in the control office selectively controlled in accordance with the character of the carrier frequency impulses as transmitted by the control office, a plurality of station relays in the control office one for each station having energizing circuits governed by said station registration relays, station selecting means initially effective at each field station having new indications to transmit and governed in accordance with the character of the series of impulses transmitted from the control office during the operating cycle, said station selecting means at a field station remaining effective only if the impulses transmitted from the control office correspond with the code call belonging to that station, and means effective only if the station selecting means at a field station is effective after said series of impulses for transmitting a check pulse to the control office for energizing the corresponding station relay having its energizing circuit selected by the existing condition of said station registration relays.

24. In a code communication system for a control office and a plurality of field stations, transmitting means at the control office for sending to all field stations a series of carrier frequency impulses each having character determined by the code element received from a field station during the next preceding off interval, a station selecting relay at each field station, apparatus at each field station for transmitting only while its associated station selecting relay is energizing code elements during successive off intervals dependent upon the code call for that station, means for maintaining the station selecting relay at a station energized only so long as the character of the impulses received from the control office match its code call, a plurality of station relays in the control office one for each station, means in the control office governed in accordance with the character of the impulses transmitted by the control office for selectively controlling energizing circuits for said station relays, and means at each field station effective during the next off interval following transmission of said series of station selecting impulses from the control office only if the associated station selecting relay is then energized for sending to the control office a check pulse for energizing the corresponding station relay.

25. In a code communication system for a control office and a plurality of field stations, means in the control office operable during an operating cycle to transmit code elements of variable characters to the field stations and for transmitting an impulse of a different and distinctive character for clear-out control at the end of an operating cycle, apparatus at each field station conditioned by the reception of a code element of a certain character from the control office to transmit code elements to the control office, manually operable means at each field station for disconnecting and establishing an operative relationship between that field station and the control office, and means at each field station actuated by operation of the associated manually operable means to disconnect that field station from the control office and restored only in response to the reception of said clear-out control for rendering said apparatus at that field station ineffective, whereby a field station apparatus after being operatively disconnected from the control office is not effective when reconnected to transmit code elements to the control office until after a clearout control has been received, so that the reconnection of a field station to the control office during an operating cycle will not allow such field station to create interfering code elements during that cycle.

26. In a code communication system for establishing communication between a control office and a plurality of field stations one at a time during operating cycles, means in the control office operable when set into operation to transmit a plurality of code elements of variable characters to the field stations for conditioning and stepping operation during an operating cycle, said means in the control office also acting at the end of an operating cycle to transmit an impulse of a distinctive electrical character to all the field stations for clear-out control, means at each field station including stepping means conditioned for operation by the reception of a code element from a control office of one character and acting at times when so conditioned to transmit code elements to the control office, manually operable means at each field station for operatively disconnecting and connecting that field station with the control office, and means at each field station including a stick relay deenergized by the disconnecting operation of said manually operable means and restored only in response to the reception of a clear-out control for preventing conditioning and operation of said stepping means at said field station until after a clear-out control has been received.

27. In a code communication system for providing communication between a plurality of field stations one at a time and a distant control office during successive operating cycles, receiving relays at a field station separately energized in response to the reception of impulses of different electrical character from the control office, cycle marking means energized by the energization of either of said receiving relays and maintained energized until both of said receiving relays are energized at the same time, a normally energized lockout stick relay having a front contact included in the energizing circuit for said cycle marking means, said lockout stick relay having a stick circuit broken by energization of either of said receiving relays and a pick-up circuit closed only if both of said receiving relays are energized at the same time, a manually operable switch for operatively disconnecting said receiving relays from the control office and automatically deenergizing said lockout relay, and transmitting means at each field station including stepping relays and effective only if said cycle marking means is energized for transmitting impulses to the control office.

28. In a code communication system operating by space radiation of carrier frequency impulses for providing communication between a plurality of field stations one at a time and a control office, a radio transmitter and a receiver at the control office and at each field station operating on the same carrier frequency, modulating means associated with the transmitter in the control office for modulating the carrier frequency impulses with either of two distinctive control tones, two receiving relays at each field station, demodulating means and filters associated with the receiver at each field station for selectively energizing the associated receiving relays dependent upon the tone modulation of the carrier frequency impulses received from the control office, impulsing means in the control office including stepping relays for rendering the associated transmitter effective at time spaced intervals to send out impulses of carrier frequency modulated with control tones in accordance with a station selecting code call, and means at each field station including stepping relays for at times rendering the associated transmitter effective for a short pulse period only during the off intervals between the impulses sent from the control office to transmit to the control office a pulse of the same carrier frequency without modulation.

29. In a multiple impulse code type communication system for providing communication between a control office and a field station, code transmitting means at the control office for transmitting different series of energy impulses, each energy impulse being of a particular frequency distinctively modulated with a control tone in accordance with the control to be transmitted except the last impulse which is modulated by at least two of said control tones to constitute a clear-out control impulse, step-by-step means at the field station operated step by step in response to each energy impulse of the series irrespective of its distinctive modulation, means at the field station controlled on each step of said step-by-step means in accordance with the distinctive control tone modulation of the energy impulse for that step, and means at the field station responsive to the clear-out control impulse of any series to restore said step-by-step means to its normal condition in readiness for another series.

30. In a code communication system operating by carrier frequency transmission for communication between a control office and a selected one of a plurality of field stations, transmitting means in the control office including stepping means for transmitting at spaced intervals impulses of a carrier frequency modulated with a selected one of a plurality of control tones to provide distinctive code elements, said code elements for certain of said intervals representing the code call for the field station to be selected and the remaining code elements constituting the controls to be communicated to that field station except the last which has a distinctive character for a clear-out control, receiving means at each field station including an amplifier with demodulating means and separate filters tuned for the respective tone frequencies transmitted from the control office, a receiving relay connected to each filter and energized in response to the transmission of a carrier frequency modulated with the corresponding tone, stepping means at each field station operated in response to the energization and deenergization of any one of said receiving relays, station selecting means having circuits governed by said stepping means and effective after transmission of station selecting code elements from the control office only if such code elements match the code call for that station, control devices having circuits governed by said stepping means and operated in response to the character of control code elements transmitted from the control office only if the associated station selecting means is effective at the time, and means at each station responsive to the reception of the clear-out code element for restoring said station selecting means at that station to a non-selecting condition.

31. In a code communication system operating by space radiation of a carrier frequency, field station apparatus comprising a receiver responsive to impulses of a carrier frequency, two receiving relays, demodulating means and filters for rendering said receiving relays separately responsive to modulations of said carrier frequency impulses by distinctive control tones, a stepping means operated sequentially by the intermittent energization of either of said receiving relays, control means selectively operated on each step depending upon which of said two receiving relays is operated for that step, and pulsing means governed by said stepping means and effective only during deenergization of both of said receiving relays for selectively transmitting or not a short pulse of said carrier frequency without modulation by said control tones in accordance with the indications to be transmitted.

32. A communication system operating by space radiation of impulses of carrier frequency comprising, a transmitter and a receiver in the control office and at each field station for transmitting and receiving the same carrier frequency, means associated with each receiver for rendering it inactive while the associated transmitter is effective, means in the control office acting when set into operation to transmit spaced impulses of said carrier frequency modulated with one or the other of two distinctive control tones, means at each field station governed by the associated receiver and including demodulating and filtering means for responding distinctively to the tone modulation of said carrier frequency impulses transmitted from the control office, and means at each field station operable during an indication operating cycle if that station has new indications to transmit for operating its associated transmitter at intervals to send short pulses of the same carrier frequency without modulation only during the off intervals between the impulses received from the control office, said means operating to create such short pulses in accordance with a code call allotted to that field station and the indications to be transmitted from that station.

33. In a code communication system of the type described for establishing communication between a control office and a field station by space radiation during successive operating cycles, transmitting means and receiving means at the control office and at the field station, each transmitting means acting while in operation to render its associated receiving means ineffective, means in the control office including step-by-step means for governing the associated transmitting means to send a series of distinctive signal pulses to comprise a control code ending with a characteristic clear-out signal, means at the field station including step-by-step means governed by the associated receiving means for controlling the associated transmitting means for a relatively short time during successive off intervals in accordance with the indication code to be transmitted from that station, and means at said field station responsive to said characteristic clear-out signal to restore said step-by-step means to its normal condition.

34. In a code communication system of the type described for establishing communication between a control office and a field station by space radiation during successive operating cycles, radio transmitting and receiving means at the control office and the field station, each radio transmitting means acting while in operation to render its associated radio receiving means ineffective, control means in the control office including step-by-step means for governing the associated radio transmitting means to send a series of distinctive carrier signal pulses modulated by any one of a plurality of distinctive tones to comprise a control code and ending with a clear-out signal pulse characterized by at least two of said distinctive tones, means at the field station including step-by-step means governed by the associated radio receiving means for controlling the associated radio transmitting means for a relatively short time during successive off intervals between the signal pulses transmitted from said control office to transmit short signal pulses during the off intervals as selected in accordance with the indications to be transmitted from the field station, means for initiating the operation of said step-by-step means at the field station upon the reception of the initial pulses of any series of signal pulses but acting to restore said step-by-step means to a normal inactive condition only in response to the reception of said clear-out signal pulse at the end of a series of signal pulses, and means at the field station distinctively controlled on each step of said step-by-step means in accordance with the particular distinctive tone modulating the carrier signal pulse for that step.

35. In a code type communication system operating by the transmission of different series of signal pulses, each pulse of which may be either of two unlike characters and each series terminating by a clear-out signal pulse having both said characters, a field station equipment comprising, means including two receiving relays one for each different character of said signal pulses and energized when its corresponding character of signal pulse is received, a repeater relay operated by the energization of either of said receiving relays but not when both of said receiving relays are energized, cycle demarking relay means rendered active when said repeater relay is operated and rendered inactive when both of said receiving relays are energized in response to said clear-out signal pulse, and stepping relays operated step by step by the operation of said repeater relay only when said cycle demarking relay means is rendered active.

NEIL D. PRESTON.
FOREST B. HITCHCOCK.

REFERENCES CITED

The following references are of record in the file of this patent:

UNITED STATES PATENTS

| Number | Name | Date |
|---|---|---|
| 2,141,551 | Phinney | Dec. 27, 1938 |
| 2,289,517 | Muether | July 14, 1942 |
| 2,368,826 | Hailes | Feb. 6, 1945 |
| 2,381,499 | Jackel | Aug. 7, 1945 |
| 2,393,377 | Jackel | Jan. 22, 1946 |
| 2,394,080 | Lawrenson | Feb. 5, 1946 |
| 2,411,375 | Jackel | Nov. 19, 1946 |